(12) United States Patent
Tanaka et al.

(10) Patent No.: US 6,400,912 B1
(45) Date of Patent: Jun. 4, 2002

(54) IMAGE FORMING APPARATUS WITH DETECTION OF MEDIA AND SETTING A THRESHOLD FOR THE DETECTOR

(75) Inventors: Toshiaki Tanaka, Fukaya; Masataka Muratani, Akishima, both of (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/667,098

(22) Filed: Sep. 21, 2000

(51) Int. Cl.$^7$ .............................................. G03G 15/00
(52) U.S. Cl. ....................................................... 399/45
(58) Field of Search ........................ 399/45, 389, 396; 250/559.01, 559.11, 559.39

(56) References Cited

U.S. PATENT DOCUMENTS

| | | | |
|---|---|---|---|
| 5,073,700 A | * 12/1991 | D'Onofrio | 235/436 |
| 5,139,339 A | * 8/1992 | Courtney et al. | 356/446 |
| 5,289,011 A | * 2/1994 | Wong et al. | 250/559.29 |
| 5,293,047 A | * 3/1994 | Matsuda | 250/559.29 |
| 5,652,943 A | * 7/1997 | Matsuo | 399/21 |
| 5,751,443 A | * 5/1998 | Borton et al. | 356/446 |

FOREIGN PATENT DOCUMENTS

| | | | |
|---|---|---|---|
| JP | 05-022497 | * | 1/1993 |
| JP | 09212000 | * | 8/1997 |
| JP | 09-218592 | * | 8/1997 |
| JP | 10-161441 | | 6/1998 |
| JP | 10-236697 | * | 9/1998 |

* cited by examiner

*Primary Examiner*—Robert Beatty
(74) *Attorney, Agent, or Firm*—Foley & Lardner

(57) ABSTRACT

An image forming apparatus of the present invention comprising image forming sections for forming images by using developer, a supplying/transporting mechanism for feeding image formation media toward the image forming sections, identifying device for performing identification of the type of the image formation media, and a transportation speed adjusting unit for performing adjustment of the speed of transportation by the supplying/transporting mechanism for the 5image formation media. The adjustment is performed according to outputs from the identifying device, and an identification reference adjusting section for adjusting a reference value E used for identification of the image formation media. This allows the identifying section to securely identify the type of the image formation media.

4 Claims, 17 Drawing Sheets

IMAGE FORMING APPARATUS WITH DETECTION OF MEDIA AND SETTING A THRESHOLD FOR THE DETECTOR

BACKGROUND OF THE INVENTION

The present invention relates to a color image forming apparatus that is represented by apparatuses, such as an electrophotographic-type color electrophotocopying apparatus and a color printer that form color images by superimposing monochromatic images.

Most existing color image forming apparatuses employ a print method such as that a predetermined number of monochromatic-image forming units is serially aligned, and monochromatic images formed by the individual monochromatic-image forming units are superimposed on a sheet material. These monochromatic-image forming units includes a photosensitive unit and a developing unit. The number of the monochromatic-image forming units is defined by the number of subtractive primaries (ordinarily, the number thereof four). With these monochromatic image forming units, images of subtractive primaries, yellow (Y), magenta (M), cyan (C), and black (B) (for reinforcing the darkness) are sequentially superimposed on a sheet material. The sheet material is transported by a sheet material transfer belt provided along the individual image forming units. The transfer belt is designed for transporting sheet materials including transparent resin sheets for use with overhead projectors and sheet papers. For superimposing the four images, there is also known a method that allows the four images to be transcribed on an intermediate transferring unit and allows the four images superimposed thereon to be transcribed at the same time.

In these color image forming apparatuses, four color images (four images) are required to be accurately superimposed. Therefore, various types of control are employed to obtain accurately superimposed images.

For example, the control includes the photosensitive unit peripheral speed control and belt peripheral speed control. The photosensitive unit peripheral speed control controls a drum-driving motor to rotate at a constant speed so that a photosensitive-unit peripheral speed, by which an arbitrary point on a peripheral surface of the photosensitive unit provided in each of four photosensitive units is moved, is the same as the belt peripheral speed, by which an arbitrary point on a sheet material transfer belt rotated by a belt driving motor is moved. The belt peripheral speed control detects the rotation speed of a transferring-belt driving motor and thereby controls it to be constant so that the photosensitive-unit peripheral speed is the same as that of the belt. Also, correction is included in the control to be performed for spacings at which portions where the individual photosensitive units of the four image forming units in contact with the sheet material transfer belt. The correction is performed by changing image forming timing for portions where the images are superimposed.

However, in actual operation, it is difficult to obtain a superimposed image that is completely free of deviation for various reasons. The reasons include positional deviations occurring when exposure light is incident on the individual photosensitive units, deviations in pitch of the photosensitive units (image forming units), slippage occurring between a driving roller for driving the sheet material transfer belt and the sheet material transfer belt, the variation in the peripheral speed of the sheet material transfer belt because of changes in the diameter of the driving roller due to thermal expansion.

For these reasons, a run-in control sequence for converging color deviations and an image-density control sequence are also included in the control. The run-in control sequence converges color deviations occurring when images are superimposed. This control is carried out at power-on time and using warm-up time after a cover or the like is opened or shut after sheet materials are jammed or stacked in the apparatus. The image-density control sequence serves to maintain the image density (toner adhesion amount) even when characteristics vary according to the variation in temperature and aged deteriorations.

With the described various corrective control operations being provided, however, color deviation (positional deviation in the superimposed image) occurs. This color deviation occurs when the difference occurs between the peripheral speed of the sheet material transfer belt and the speed of transportation of sheet materials that are transported by an aligning roller toward the sheet material transfer belt.

For example, when the transportation speed of the aligning roller is lower than the peripheral speed of the sheet material transfer belt, the aligning roller causes a load to exert on the sheet material transported by the sheet material transfer belt. The load is exerted in the direction opposing the direction in which the sheet material is transported; therefore, the sheet material is pulled in the aforementioned direction, color deviation occurs on the whole of the sheet material. Also, jitter is caused because of influence of oscillation in paper-feed driving system, which is transferred from the aligning roller.

In contrast, when the transportation speed of the aligning roller is higher than the peripheral speed of the sheet material transfer belt, great deflection occurs on the sheet material. The deflection occurs in a space defined by upper and lower guides provided so as to sandwich the sheet material from the upper and lower sides. That is, the deflection occurs in front and back portions in the direction in which the sheet material is transported between the aligning roller and a roller provided for electrically charging the sheet material is electrostatically attracted onto the sheet material transfer belt. When the deflection of the sheet material increases to a level that cannot be incorporated in the aforementioned space, the deflection extends and thereby causes the sheet material to shake (or, to wave) in the direction in which the sheet material positioned on the sheet material transfer belt is pushed. This causes the position of the sheet material placed on the sheet material transfer belt to deviate, thereby causing color deviation as in the earlier case.

Thus, an appropriate speed range is narrow for the sheet material transportation speed required for the aligning roller; therefore, the speed must be neither excessively high nor excessively low. An image forming apparatus dedicatedly handling the monochromatic color (black) does not perform color-superimposing, and an image forming apparatus performing digital processing represents the density gradation in the density of pixels by performing binary-coding processing. Therefore, in either of these image forming apparatuses, jitter does not easily occur. However, in the color image forming apparatus, color-superimposing must be performed, and in addition, the density gradation is obtained by multivalue processing, in which pixels having sizes differing from each other are formed at uniformed pitches, thereby causing noticeable jitter.

The color image forming apparatuses as described above also includes multiple image (position) sensors for converging color deviations occurring when images are superimposed. Also, it has an image-density control sensor that serves to maintain the image density (toner adhesion amount) even when characteristics vary according to the variation in temperature and aged deteriorations. In addition, the color image forming apparatus includes an identifying sensor for overhead projector (OHP) sheets.

With this application, the inventor proposed a technique that calculates the sheet material transportation speed, as described above, thereby allowing control of the number of revolutions of the driving roller, which drives the sheet material transfer belt, and the peripheral speed of the photosensitive-unit drum.

However, the proposed techniques, which controls the number of revolutions of the driving roller, which drives the sheet material transfer belt, and the peripheral speed of the photosensitive-unit drum, still arises a problem. The problem is that, for OHP sheets as sheet materials, detection outputs produced by individual sensors contain many errors, and the OHP sheets cannot be identified.

BRIEF SUMMARY OF THE INVENTION

An object of the present invention is to provide a color image forming apparatus that adjusts relative differences in sheet material transportation speeds of a sheet material supplying unit and image forming units to be within an appropriate relative speed range and that, particularly, prevents color deviations from being occurred in a color mode.

Another object of the invention is to provide a color image forming apparatus that allows transparent sheets for use with OHPs to be accurately identified.

Still another object of the invention is to provide a color image forming apparatus that accurately detects test images, thereby allowing forming of color images even for OHP sheets, without causing defects such as variation in the output image density and deviation in timing for image forming, as in the case of ordinary sheet papers.

The present invention provides an image forming apparatus comprising: image forming means for forming images by using developer; supplying means for feeding image formation media toward the image forming means; transporting means for transporting the image formation media that have been fed; transferring means for transferring developer images formed on the image forming means onto the image formation media; identifying means for performing identification of the type of the image formation media; transportation speed adjusting means for performing adjustment of the speed of transportation by the supplying means for the image formation media, the adjustment being performed according to outputs from the identifying means; and identification reference adjusting means for adjusting a reference value E used for identification of the image formation media, the identification being performed by the identifying means, wherein a sequence for adjustment of the reference value E is executed by the identification reference adjusting means, and identification is thereby implemented for the type of adjustment sequences that are executed by the transportation speed adjusting means for the speed of transportation of the image formation media and the type of the image formation media.

In addition, the invention provides an image forming method for feeding image formation media toward an image forming apparatus and forming images on the image formation media, comprising: a step of feeding a first adjustment sheet to an identifying means provided for identifying an image section and a non-image section formed on the image formation media, the first adjustment sheet having a predetermined image and being used for adjustment of a reference value with which the identifying means performs identification; a reading step of allowing the identifying means to read the image section of the first adjustment sheet and the non-image section of thereof; a reference value adjusting step of adjusting the reference value of the identifying means according to a read value regarding the image section and a read value regarding the non-image section; a step of feeding a second adjustment sheet to the identifying means of which the reference value has been adjusted in the reference value adjusting step, the second adjustment having a predetermined image and being used for adjustment of a speed at which the image formation media are fed to image forming means; a speed adjustment step of adjusting a feeding speed for the image formation media according to results of the identification performed by the identifying means for the image section of the second adjustment sheet and the non-image section thereof; and a step of feeding the image formation media to the image forming means at the speed adjusted in the speed adjustment step and forming images on the image formation media that have been fed.

DETAILED DESCRIPTION OF THE INVENTION

Hereinbelow, referring to the accompanying drawings, a description will be given of a color image forming apparatus according to an embodiment of the present invention.

Figure 1:
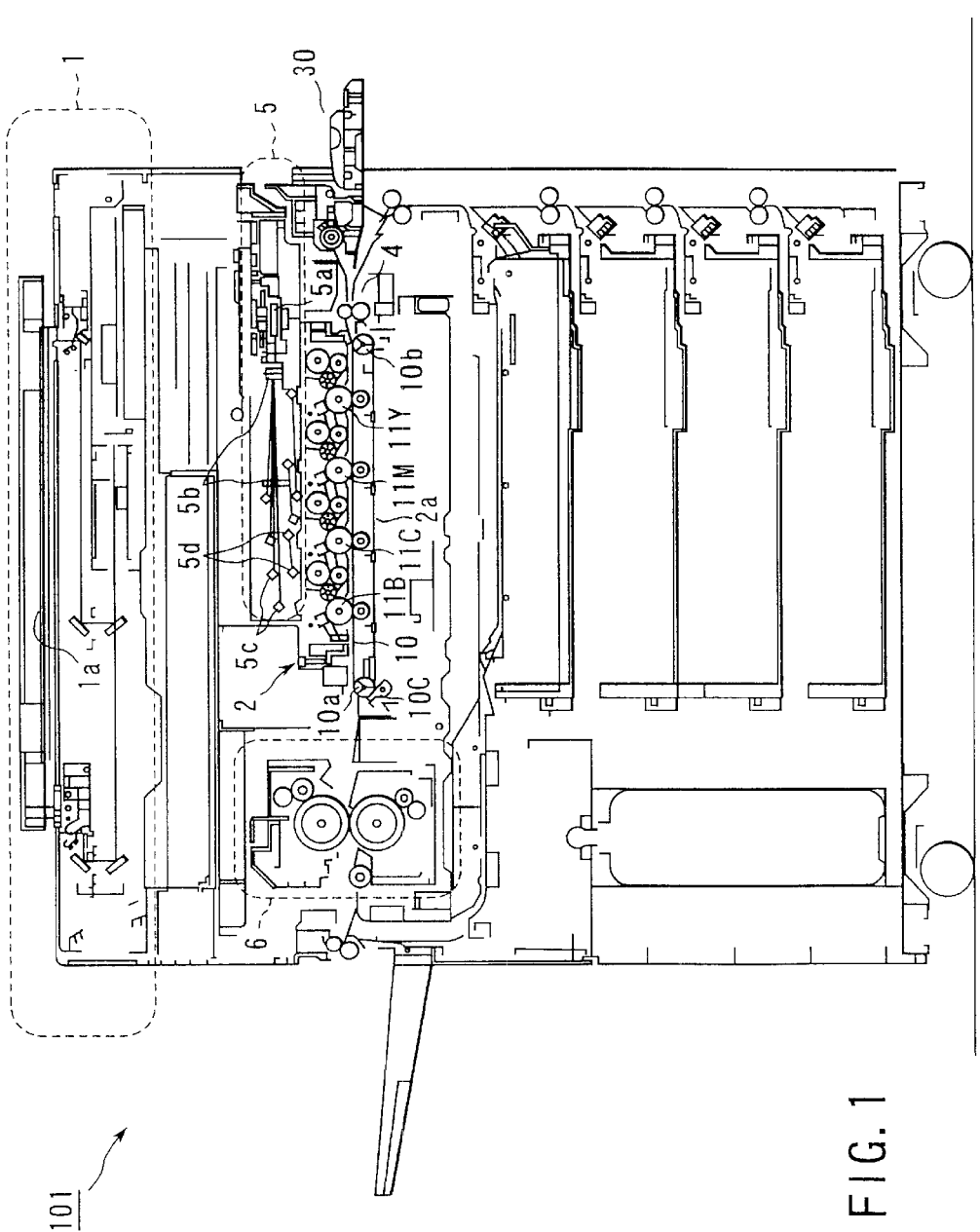
FIG. 1 is a schematic view showing a four-drum color image forming apparatus to which an embodiment of the present invention is applied.

FIG. 1 is a schematic view showing electrophotography-type color image forming apparatus; particularly, the view shows a quadruple-type color photocopying apparatus in which a plurality of electrophotographic image forming sections is provided for the same sheet material transfer belt.

A color photocopying apparatus 101 as shown in FIG. 1 includes an original-material table 1a on which a photocopying object, such as an original manuscript or a book, is placed. Image data of an image is read out via a scanner 1 from an original manuscript (not shown) placed on the original-material table 1a. Alternatively, image data is received from an external unit represented by a computer or the like (not shown). The image data is then stored in image memory which is described below, and image processing therefor is performed in an image-data processing circuit, which will be described below using FIG. 3, and a color image is formed by an image forming unit 2 described below. As image data, any data pattern that is applicable to each of R, G, and B (additive primaries) or C, M, and Y (subtractive primaries) can be used.

Figure 2:
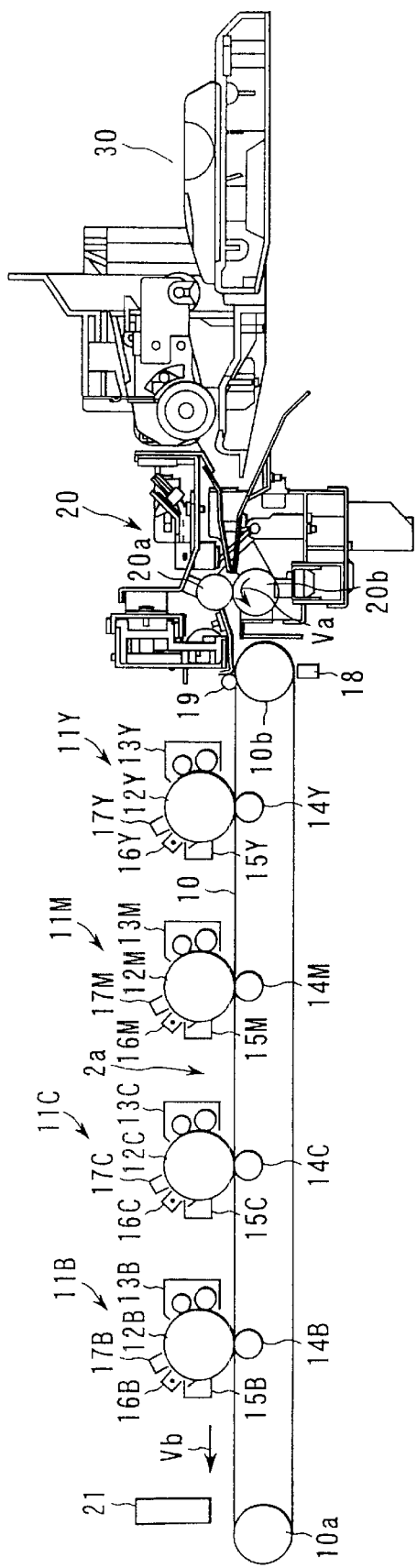
FIG. 2 is a schematic view showing main portions of image forming units in the image forming apparatus shown in FIG. 1.

As shown in an enlarged view in FIG. 2, according to four image forming signals Y (yellow), M (magenta), and C (cyan), which are color-separation elements of the subtractive primaries, and B (semi-black), the image forming unit 2 includes first, second, third, and fourth image forming sections 11. Since many elements constituting the image forming sections 11 are provided for four sets corresponding to the primary colors Y, M, C, and B, the elements are identified by adding the subscripts Y, M, C, and B.

The individual image forming sections 11 are arranged to oppose each other at a predetermined spacing. Also, they are arranged to have a predetermined spacing from an endless belt (sheet material transfer belt) 10 and are arranged along the direction of the face of the sheet material O. The sheet material transfer belt 10 transports transfer materials (image-output mediums), such as sheet papers or sheet materials O made of transparent resin for use with overhead projectors.

In the individual image forming sections 11, photosensitive-unit drums 12 and a developing unit 13 are installed. The photosensitive-unit drum 12 allows forming of latent images corresponding to one of the Y, M, C, and B image forming signals. The developing unit 13 contains toner of the individual primary colors Y, M, C, and B for visualizing the latent images formed on the photosensitive-unit drum 12. The individual image forming sections 11 can be arranged in the sequence optionally defined. In the embodiment of the invention, the individual image forming sections 11 are provided in the sequence of Y, M, C, and B in the direction in which an arbitrary point on the sheet material transfer belt 10 moves, that is, from the upstream side in the direction in which the sheet materials O are transported. The image forming sections 11 are arranged so as to superimpose the four color images in the sequence of Y, M, C, and B.

Around the photosensitive-unit drums 12, transferring units 14 are provided in the positions individually opposing the photosensitive-unit drums 12. The individual transferring units 14 electrostatically adsorb toner images individually formed on the photosensitive-unit drums 12 and transcribe the toner images on the sheet material O that is electrostatically adsorbed on the sheet material transfer belt 10 and is thereby transported.

Also, around the photosensitive-unit drums 12 there are individually provided cleaning units 15, discharging units 16, and charging units 17. The cleaning units 15 remove toner remaining on surfaces of the corresponding photosensitive-unit drums after the individual toner images are transcribed on the sheet material O. The discharging units 16 remove electrical charge remaining in the corresponding photosensitive-unit drums after toner is removed by the corresponding cleaning unit 15. The charging unit 17 gives a predetermined potential to the corresponding the photosensitive-unit drum 12.

The sheet material transfer belt 10 is formed of a conductive urethane rubber material having a thickness of about 0.5 mm, and is wound over a first roller 10a (driving roller) and a second roller 10b (driven roller). Rotation of the driving roller 10a moves an arbitrary point on the sheet material transfer belt 10 in the direction, as a matter of course, in which the sheet materials O are transported. Specifically, in the present embodiment, as viewed from the side where one of the two surface areas closes to the four image forming sections 11, the direction in which the sheet material O is transported is the direction in which the sheet material O moves from the first image forming section 11(Y) to the fourth image forming section 11(B). A peripheral portion of the sheet material transfer belt, which includes a belt motor (described below using FIG. Y) provided for driving the sheet material transfer belt 10, the driving roller 10a and the second roller 10b; and the driving roller 10a is arranged as a transferring unit 2a. The transferring unit 2a is arranged so as to be integrally attachable to or detachable from all the photosensitive-unit drums 12 of the image forming sections 11 when a monochromatic image (B image) is formed.

An electrostatically charging unit 18 is provided in a predetermined position close to a transcription-medium supplying section 4, which supplies the sheet materials O onto the sheet material transfer belt 10, over an inner peripheral face of the sheet material transfer belt 10 on the side of the image forming sections 11(Y) with respect to the direction of transportation of the sheet materials O. The electrostatically charging unit 18 allows the sheet material transfer belt 10 to be preliminarily charged with static electricity for adsorbing the sheet materials O. Also, an adsorption roller 19 is provided over an outer peripheral face of the sheet material transfer belt 10. The adsorption roller 19 allows the sheet materials O to be adsorbed onto the sheet material transfer belt 10 preliminarily charged by the electrostatically charging unit 18. Specifically, the adsorption roller 19 is provided in a slightly downstream portion in a direction in which the sheet material O in a position where the sheet material O is controlled to contact the sheet material transfer belt 10 is transported from the transcription-medium supplying section.

An aligning section 20 is provided between the sheet material transfer belt 10 and the transcription-medium supplying section 4; specifically, it is provided in a position spaced apart somewhat farther from the sheet material transfer belt 10 than a position where the sheet materials O are fed by the transcription-medium supplying section 4 onto the peripheral face of the sheet material transfer belt 10 is spaced apart from the sheet material transfer belt 10. The aligning section 20 aligns the sheet materials O so that individual end portions of the sheet materials O that are fed toward the peripheral face of the sheet material transfer belt 10 are positioned perpendicular to the direction in which the sheet materials O are transported. Concurrently, the aligning section 20 allows the sheet materials O to be transported with their end portions being maintained to be perpendicular to the direction in which the sheet materials O are transported. The aligning section 20 includes first and second aligning rollers 20a and 20b and an aligning motor 20 m (shown in FIG. 3). The first and second aligning rollers 20a and 20b sandwich the obverse face and the reverse face of the sheet material O, respectively; and the aligning motor 20 m drives one of the rollers. In a state where the individual rollers are stopped, the end portion of the sheet material O transported from the transcription-medium supplying section 4 is once stopped, thereby causing its end portion to be deflected. Then, the first and second aligning rollers 20a and 20b are rotated. When the end portion of the sheet material O returns to the original state, the rotation of the first and second aligning rollers 20a and 20b keeps the end portion of the sheet material O to be perpendicular to the direction in which the sheet materials are transported, and concurrently, allows to keep the sheet material O to be perpendicular to the transportation direction. In this way, the aligning section 20 aligns the sheet materials O.

Exposing units 5 are provided in predetermined positions over the individual image forming sections 11. The exposing units 5 has laser diodes or the like (not shown). The laser diodes emit exposure light beams (laser beams) with timing set in a timing control section 113 and according to image forming signals for which image-processing is performed by image-data processing sections 115 (described below using FIG. 3) for image data of the individual colors.

Through multiple cylindrical lenses 5b, plane mirrors 5d, and the like, the exposing units 5 deflect laser beams from the laser diodes, which illuminate according to the image forming signals, the laser beams being changed for their luminous intensities, to the direction of axes of the individual photosensitive-unit drums 12 (direction perpendicular to the direction in which the sheet materials O are transported). Thus, while deflecting the laser beams, the exposing units 5 sequentially emit the laser beams onto the individual photosensitive-unit drums 12. Thereby, electrostatic latent images corresponding to the individual colors are formed on the photosensitive-unit drums 12 of the image forming sections 11.

A fixing unit 6 is provided in a position spaced farther than the first driving roller 10a is spaced in the direction in which the sheet materials O are transported. The fixing unit 6 is thus provided to fix four-color toner images formed on the sheet material O. Specifically, the fixing unit 6 includes a first roller (heating roller), a second roller (pressing roller), and a heater (not shown). The heater is provided for heating at least one of the aforementioned rollers. The first roller is cylindrically formed to have a predetermined thickness. The second roller is arranged parallel to the first roller and along the longitudinal direction of the first roller so as to be in contact with a peripheral point Of the first roller. The sheet material O is pressed between the two rollers and is fed to pass therethrough. Thus, toner adhered on the sheet material O is heated, and the toner is thereby fixed onto the sheet material O.

FIG. 3 is a schematic block diagram that will be used to explain a control circuit for controlling each of four image forming sections 11 (Y, M, C, and B) of the color photocopying apparatus 101.

According to an image forming start signal issued from a control panel or a host computer, a main control unit 111 starts control, warms up the image forming sections 11 (Y, M, C, and B), and rotates a polygonal mirror 5a at a predetermined revolution speed.

Subsequently, control of the main control unit 111 allows image data, which is due to be printed, to be retrieved from an external unit, such as the scanner 1 or a computer, and to be stored in a RAM 121. Part (or, the whole) of the image data retrieved and stored in the RAM 121 is controlled by an image control CPU 112 so as to be stored in four units of image memory 122 (Y, M, C, and B).

Also, control of the main control unit 111 allows the sheet materials O to be fed toward the transcription-medium supplying section 4 from either a cassette or a bypass feeding section 30 with a predetermined timing with reference to, for example, a vertically-synchronous signal or the like, issued from the timing control section 113. The sheet materials O fed from the transcription-medium supplying section 4 are then fed with timing adjusted by the aligning section 20, with which the first and second aligning rollers 20a and 20b are in contact so as to meet the timing of the individual Y, M, C, and B toner images provided by image forming operation of the individual image forming sections 11 (Y, M, C, and B). Then, the sheet materials O are adsorbed by the adsorption roller 19 onto the sheet material transfer belt 10 and are thereby guided toward the image forming sections 11.

In synchronization with or at the same time as feeding and transporting operations for the sheet materials O, the laser diodes of the exposing units 5 for the individual colors are urged by corresponding laser driving sections 116 (Y, M, C, and B) according to clock signals CLK outputted by a timing setting unit 118 (clock circuit). Concurrently, the laser diodes are subjected to modulation for their intensities corresponding to image data DAT stored in the RAM 121, and are thereby caused to illuminate. According to the above, a laser beam for one line is emitted sequentially from a predetermined position in an effective print width in a main scanning direction parallel to the axial direction of the photosensitive-unit drums 12 of each of the image forming sections 11. Also, the photosensitive-unit drums 12 of the individual image forming sections 11 are rotated by drum motors 12 m at a predetermined speed. Thereby, the aforementioned laser beams each for one line sequentially emit in the direction of rotation of the photosensitive-unit drums 12. Thereby, electrostatic latent images of the four colors are formed on the photosensitive-unit drums 12 (Y, M, C, and B), each of which is preliminarily given a predetermined surface potential.

These four electrostatic latent images are developed and converted to toner images by the developing units 13 (Y, M, C, and B) using toners of the corresponding colors.

According to the rotation of the photosensitive-unit drums 12 (Y, M, C, and B), the individual toner images are moved toward the sheet materials O, and are sequentially transcribed by the transferring unit 14 onto the sheet material O placed on the sheet material transfer belt 10 at transcription positions where the photosensitive-unit drums 12 and the sheet material transfer belt 10 are in contact with each other.

According to the above, the four toner images accurately overlapped with each other on the sheet material O are formed on the sheet material O.

The sheet material O electrostatically retaining the four toner images is transported by the sheet material transfer belt 10. Then, the sheet material O is separated from the sheet material transfer belt 10 according to the difference between the curvature of the driving roller 10a and the linear-forwarding characteristics of the sheet material O, and is guided to the fixing unit 6.

The individual toner particles retained on the sheet material O are heated by the fixing unit 6 to melt, thereby mixing with each other to provide predetermined colors. Thus, the toner images are fixed as a color image, and the sheet material O is fed out to an output tray (not shown).

Figure 3A:
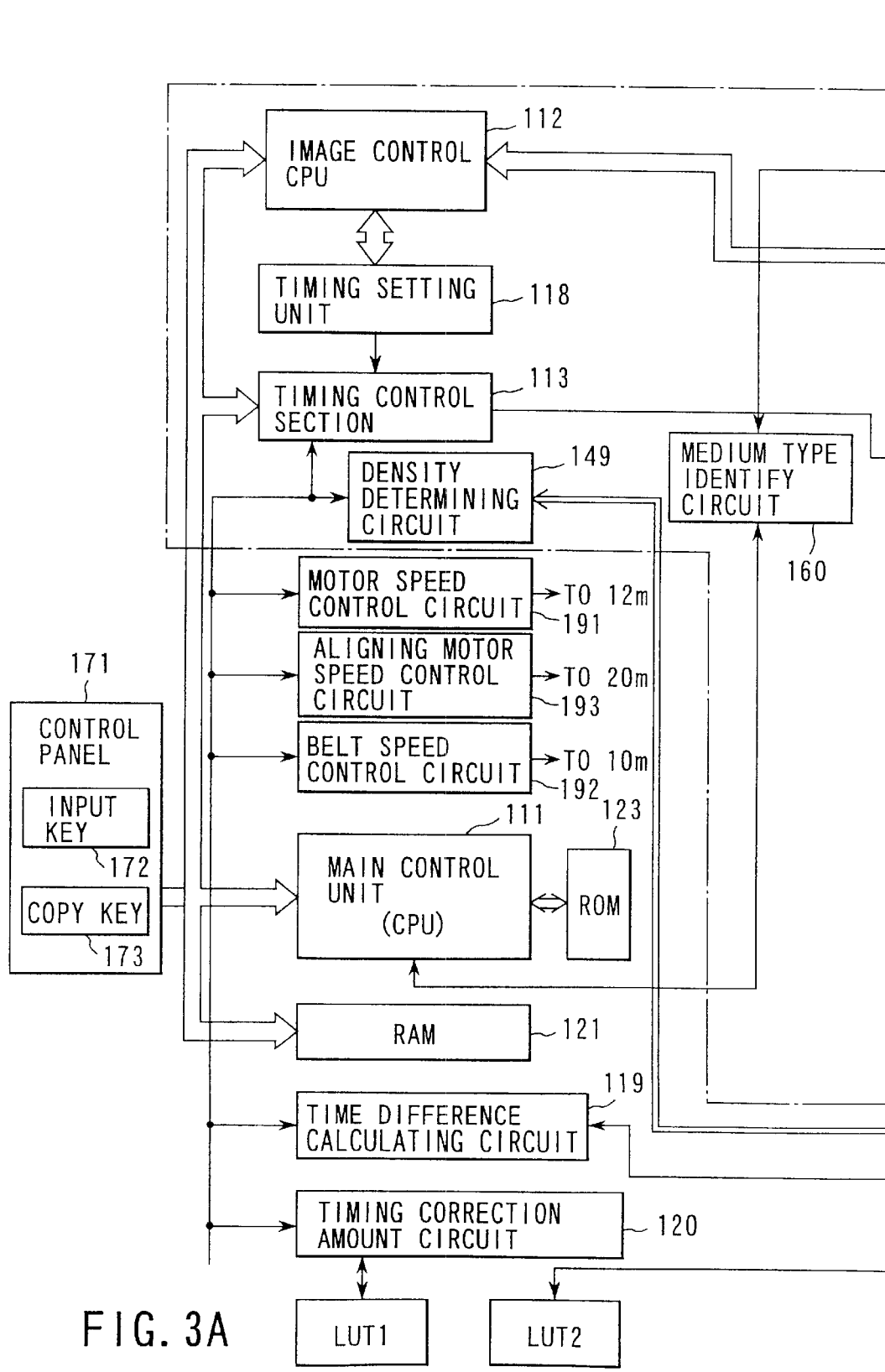
FIGS. 3A and 3B are control block diagrams of the image forming apparatus shown in FIG. 1.
Figure 3B:
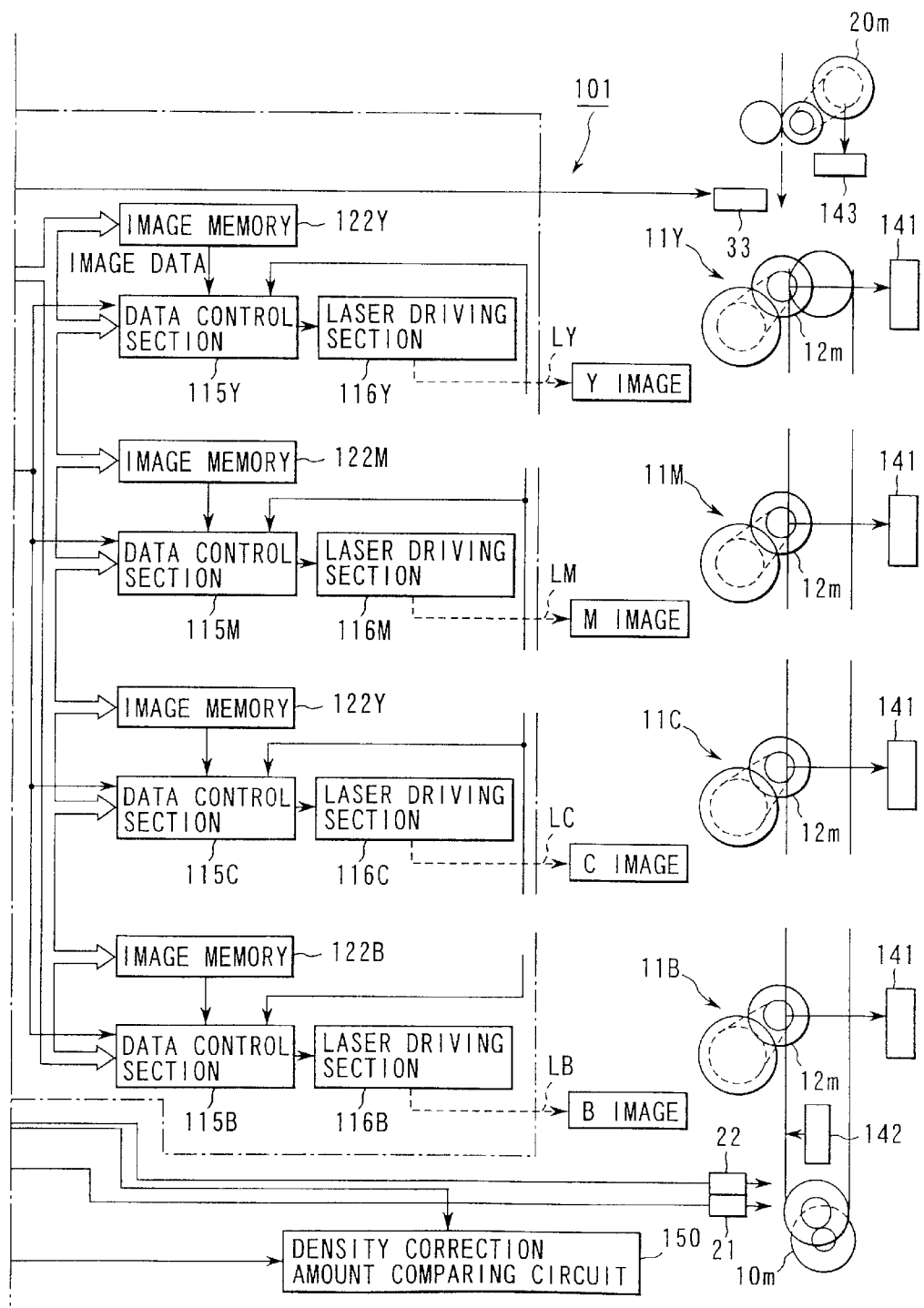

In the described color photocopying apparatus 101, as shown in FIGS. 3A and 3B, the four photosensitive units 12 (Y, M, C, and B) of the image forming sections 11 are driven by the drum motors 12 m (four motors corresponding to Y, M, C, and B) at an arbitrary number of revolutions. For this reason, compared to the speed at which the sheet materials O are transported, the speeds at which arbitrary points on outer peripheral faces of the drum motors 12 m, that is, drum peripheral speeds, are not always the same. Therefore, the numbers of revolutions of the individual drum motors 12 m are detected by motor revolution detecting units 141 and are sent to a motor speed control circuit 191 as speed detecting signals $V_{mdet}$. The number of revolutions of each of the photosensitive-unit drums 12 is amplified by an error difference $V_{merr}$ according to feedback control of the motor speed control circuit 191. The error difference $V_{merr}$ is the difference obtained by comparison between a reference value $V_{mref}$ and the speed detecting signals $V_{mdet}$ detected by the motor revolution detecting units 141. The reference value $V_{mref}$ refers to a reference value of a speed signal that is set so that the moving speeds of peripheral faces of the photosensitive-unit drums 12 can be controlled to be the same as the speed at which an arbitrary point on the sheet material transfer belt 10 is moved (that is, the belt speed). According to the above amplification, the numbers of revolutions of the individual drum motors 12 m are fed back, and are thereby controlled to be constant. The transportation speed for the sheet materials O, the drum peripheral speeds of the individual photosensitive-unit drums 12, and the speed at which the arbitrary point of the sheet material transfer belt 10 moves are the same. They are called, for example, process speeds.

Similarly, the number of revolutions of a belt motor 10 m for rotating the driving roller 10a for moving the sheet material transfer belt 10 at a predetermined speed in the direction in which the sheet materials O are sent to a belt speed control circuit 192 as a speed detecting signal $V_{bdet}$ generated by a belt speed detecting units 142. The number of revolutions is amplified by an error difference $V_{berr}$ according to feedback control of the belt speed control circuit 192. The error difference $V_{berr}$ is the difference obtained by comparison between a reference value $V_{dref}$ and the speed detecting signals $V_{bdet}$ detected by a belt speed detecting units 142. The reference value $V_{dref}$ refers to a reference value of a speed signal that is set so that the moving speeds of peripheral faces of the photosensitive-unit drums 12 can be controlled to be the same as the belt speed. According to the above amplification, the number of revolutions of the motor 10 m is fed back, and is thereby controlled to be constant.

The number of revolutions of the aligning motor 20 m for rotating one of the first and second aligning rollers 20a and 20b at a predetermined speed is sent to an aligning motor speed control circuit 193 as a speed signal $V_{adet}$ generated by an aligning-motor speed detecting units 143, is compared to a reference value $V_{aref}$, and is thereby controlled to be constant (only during rotation).

In the described color photocopying apparatus 101, the electrostatic latent images are formed by the individual photosensitive-unit drums 12 (Y, M, C, and B) of the four image forming sections 11 (Y, M, C, and B). Then, toner is selectively supplied by the developing units 13 (Y, M, C, and B), which contain toner of corresponding colors, to the electrostatic latent images. Subsequently, the toner images (Y, M, C, and B) are electrostatically adsorbed to the sheet material transfer belt 10, and are transcribed onto the sheet material O transported by movement of the sheet material transfer belt 10. At this time, movement speeds Vm of the peripheral faces of the photosensitive-unit drums 12 and a speed Vb are, as already described, controlled so as to be identical to each other; therefore, theoretically, neither deviation nor blurring should not occur with the toner images.

For equivalence to the spacing between the portions where the four photosensitive-unit drums 12 are in contact with the sheet material transfer belt 10 in the direction in which the sheet material transfer belt 10 moves, timing with which the image is formed in each of the forming sections 11 of the individual colors (Y, M, C, and B) is shifted by: inter-photosensitive-unit spacing for the individual colors/speed of the sheet material transfer belt 10 (process speed).

In this way, the color toner image obtained by superimposing the toner images of the individual colors is fixed by the fixing unit 6 onto the sheet material O.

Figure 4:
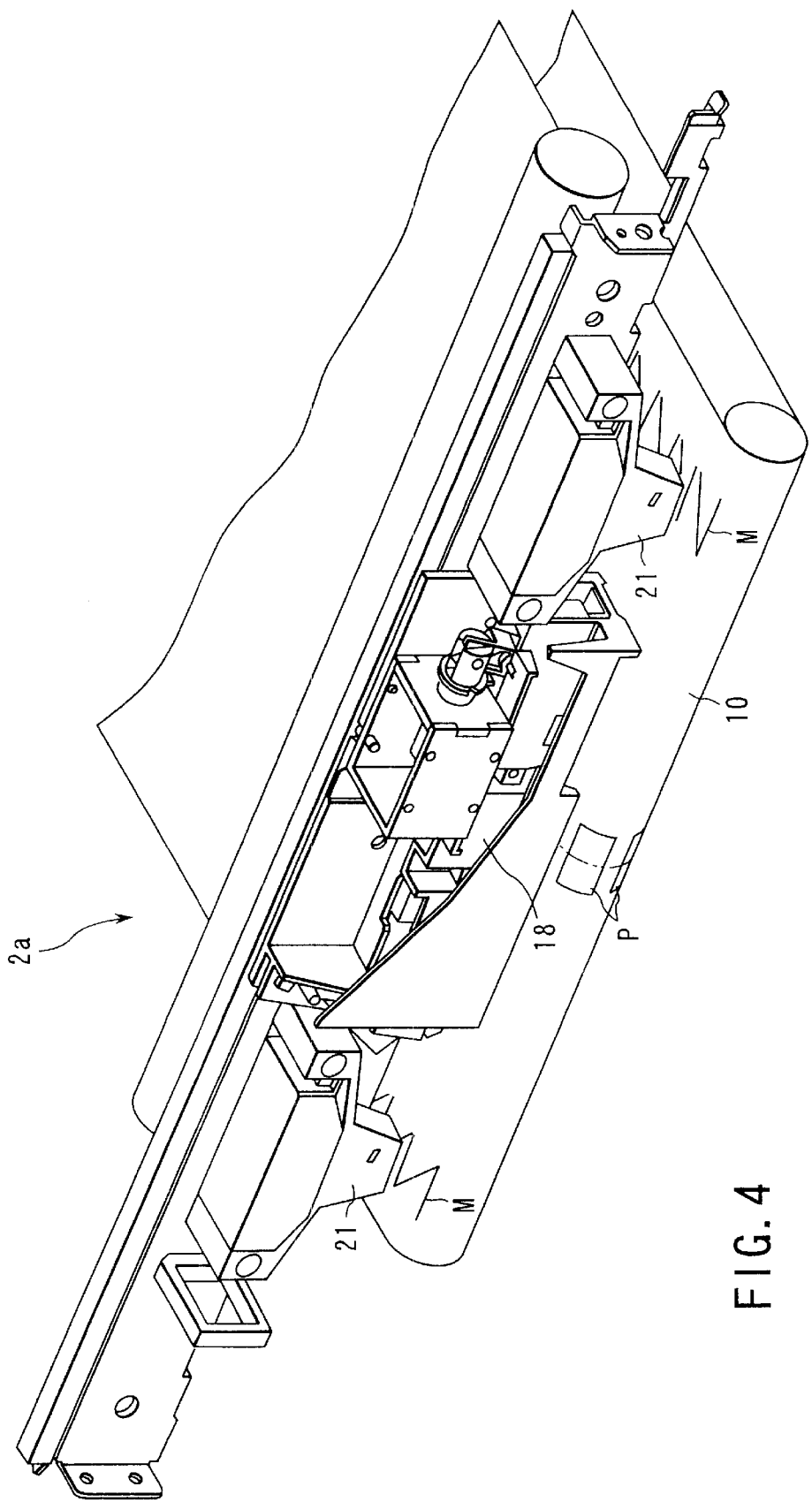
FIG. 4 is a schematic view showing a mechanism for correcting relative positional deviations of images formed by individual image forming sections of the image forming apparatus shown in FIG. 1.

FIG. 4 is a schematic view to be used to explain a mechanism for correcting relative positional deviations of images actually formed by the individual image forming sections 11 (Y. M, C, and B) of the color photocopying apparatus 101 shown in FIG. 1. A description that will be given below includes a description regarding a sequence for optimizing the image density. The description is included for the reason that there occur many cases in which characteristics of toner change according to the temperature variation and the aged deterioration, thereby causing the change in the image density, that is, the amount of toner adhering to the photosensitive-unit drums and the sheet material O.

First of all, a description will be given of the correction of the positional deviation of images.

Registration sensors 21 are provided in positions along the surface of the sheet material transfer belt 10; specifically, they are provided in predetermined positions on the downstream side spaced apart from the positions where the individual image forming sections 11 (Y, M, C, and B) and the sheet material transfer belt 10 oppose each other in the direction in which an arbitrary point on the sheet material transfer belt 10 moves. The registration sensors 21 are provided to individually detect that registration marks M have passed through. The registration marks M are provided for obtaining positional deviations of individual toner images in the direction perpendicular to the direction in which an arbitrary point on the sheet material transfer belt moves. The registration sensors 21 are provided at two portions spaced apart at a predetermined distance in the width direction of the sheet material transfer belt 10 (direction perpendicular to the direction in which the sheet materials O are transported).

The individual registration sensors 21 sequentially detect that a plurality of the registration marks M formed in the individual image forming sections 11 (Y, M, C, and B) has passed through their individual detection areas and output a plurality of mark detection signals. The mark detection signals are sequentially inputted to the time difference calculating circuit 119, and the time difference calculating circuit 119 uses the mark detection signals to calculate relative time differences among the individual mark detection signals, that is, the individual registration marks M. Therefore, the time difference calculating circuit 119 outputs time differences of the individual marks M.

Subsequently, a timing correction amount circuit 120 references a lookup table LUT1 and obtains correction amounts Z for correcting timing with which the individual image forming sections 11 (Y, M, C, and B) form images corresponding to the time differences obtained by the time difference calculating circuit 119.

Subsequently, with the obtained correction amounts Z, feedback is performed for the timing control section 113. This allows correction to be made for timing with which the individual image forming sections 11 (Y, M, C, and B) must form the images, that is, timing of image exposure with laser beams that correspond to the image forming signals and that are emitted from the exposing unit 4, thereby correcting levels of image-positional deviations. The operations for forming the registration marks M, calculating the time differences of the individual registration marks M, calculating the correction amounts Z, and correcting the exposure timing are repeated arbitrary times until the levels of image-positional deviations are corrected so as to be within an allowable level.

Hereinbelow, a description will be given of an image-density correcting sequence for optimizing the image density (output image density).

Toner density sensors 22 are provided to detect toner adhesion amounts as reflecting densities, that is, to detect amounts of toner adhered to the photosensitive-unit drums 12 and the sheet material transfer belt 10 at substantially the same phase as the registration sensors 21 for the direction in which the sheet materials O are transported and in substantially the center portion for the direction perpendicular to the direction in which the sheet materials O are transported in the vicinities of the registration sensors 21.

The sensor 22 sequentially detects that density-controlling density patches P of the individual colors, which have been formed at predetermined timing, have passed its detection area, and outputs a plurality of patch detection signals. The patch detection signals are sequentially inputted to a density determining circuit 149. The density determining circuit 149 outputs the individual patch detection signals, i.e., as density differences of the individual density patches P.

Subsequently, a density correction amount comparing circuit 150 references a lookup table LU2; and according to the densities obtained by the density determining circuit 149, it obtains correction amounts X for correcting densities of images formed by the individual image forming sections 11 (Y, M, C, and B).

Subsequently, with the correction amounts X, feedback is performed for the density determining circuit 149. According to the above, factors that determine image densities when the individual image forming sections 11 (Y, M, C, and B) form images are changed according to a predetermined routine, and new density patches P are thereby formed. The factors that determine the image densities include the amount of exposure light (laser-beam intensity), developing bias voltages according to the developing units 13, transcription voltages according to the transferring units 14, and amounts of charge from the charging units 17 to the photosensitive-unit drums 12. The operations for forming the density patches P, calculating densities of the individual patches P, calculating the correction amounts X, and correcting the exposure timing are repeated arbitrary times until image densities D are controlled so as to be in an allowable level.

Figure 5:
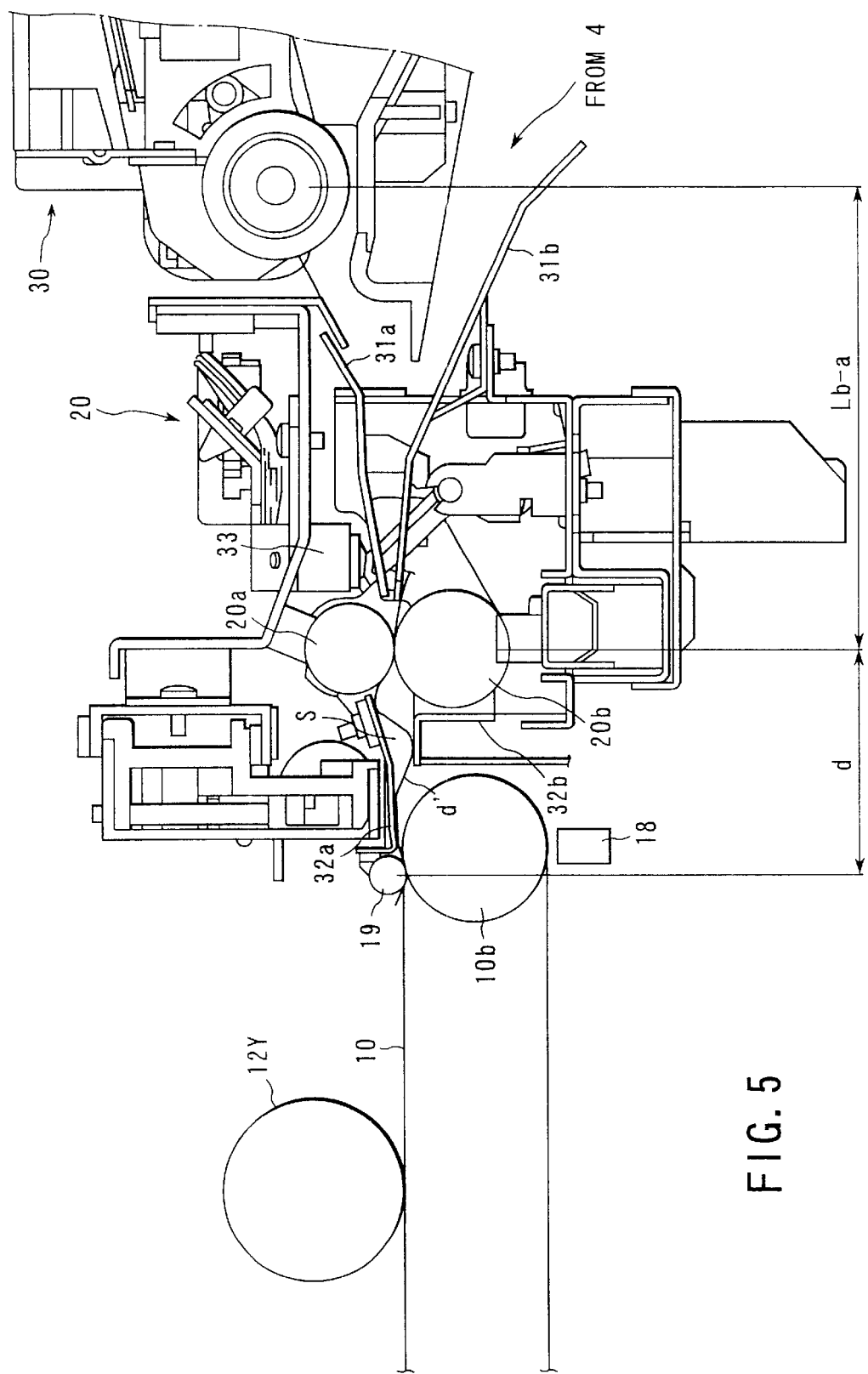
FIG. 5 is a schematic view showing the vicinity of an aligning section of the image forming apparatus shown in FIG. 1.

FIG. 5 is a schematic view showing the vicinity of the aligning section 20. As shown in FIG. 5, the bypass feeding section 30 is provided in the vicinity of the aligning rollers 20a and 20b; specifically, it is provided on the upstream side in the direction in which the sheet materials O are transported to the transferring unit 2a. The bypass feeding section 30 is capable of feeding the sheet materials O independently of the transcription-medium supplying section 4. A feed-in-side upper guide board 31a and a transportation-side lower guide board 31b are provided between the bypass feeding section 30 and the aligning rollers 20a and 20b. A feed-out-side upper guide board 32a and an ejecting-side lower guide board 32b are provided between the aligning rollers 20a and 20b and the sheet material transfer belt 10.

An OHP-sheet identifying sensor 33 (which will simply be referred to as an OHP identifying sensor, hereinafter) is provided in a predetermined position between the aligning rollers 20a and 20b and the feed-in-side upper guide board 31a. The OHP identifying sensor 33 identifies whether or not the sheet material O is a transparent OHP sheet for use with an overhead projector. When the sheet material O passing through the aligning section 20 is a nontransparent sheet paper, it outputs a predetermined signal. However, the sheet material O passing therethrough is a transparent OHP sheet, it does not issue the predetermined signal, but reports that an recording medium other than the sheet paper is passing through. The OHP identifying sensor 33 may use one of a reflecting-type optical sensor and a transparent-type optical sensor that are capable of identifying the sheet paper and the OHP sheet; however, the present invention uses the reflecting type to provide an adjusting function which will be described below in detail.

The OHP identifying sensor 33 identifies or detects a transportation speed Va at which the sheet materials O are transported toward the aligning rollers 20a and 20b in the aligning section 20. The registration sensors 21 described earlier identify or detect the transportation speed Vb for the sheet materials O in the transferring unit 2a.

Hereinbelow, referring to FIGS. 6 and 7, a description will be given of a color mode and a monochromatic mode.

Figure 6:
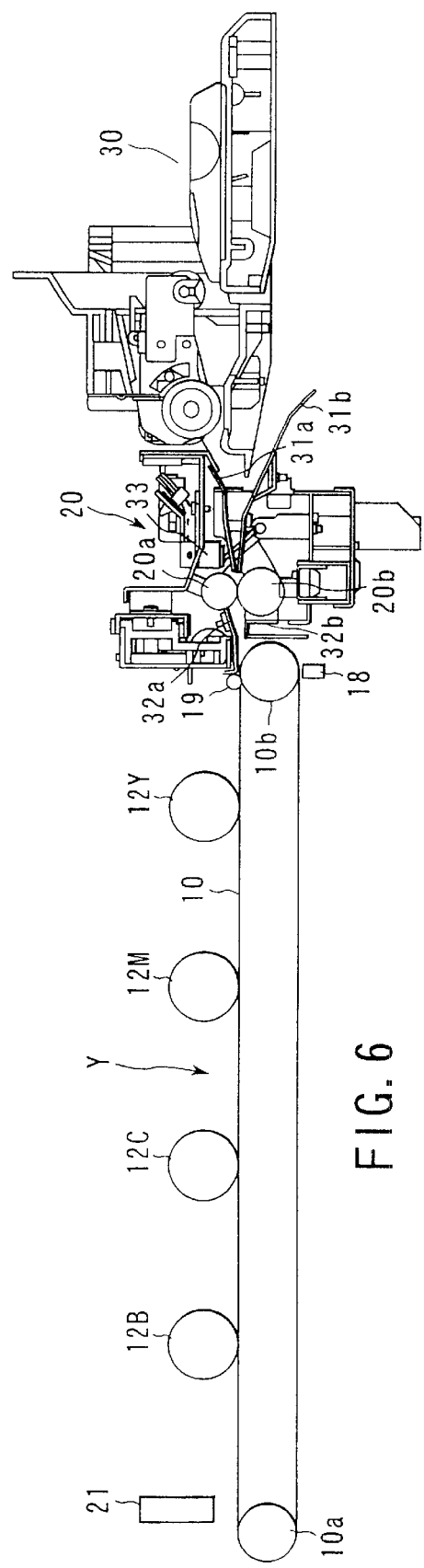
FIG. 6 is a schematic view showing a relation between an image forming unit and a sheet material transfer belt in a color mode.

As shown in FIG. 6, the color mode allows all the photosensitive-unit drums 12 (Y, M, C, and B) and the sheet material transfer belt 10 to be contacted.

Figure 7:
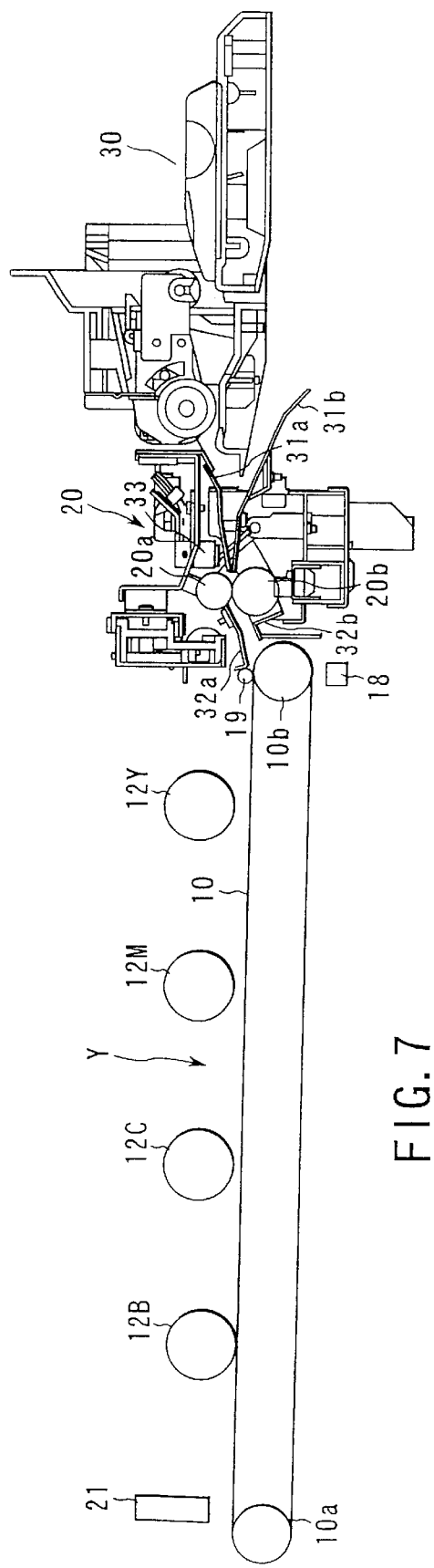
FIG. 7 is a schematic view showing a relation between an image forming unit and a sheet material transfer belt in a monochromatic mode.

However, as shown in FIG. 7, the transferring unit 2a is slanted with a rotationally contacting section where the black-handling photosensitive-unit drum 12 in the fourth image forming section 11B as a central point, and the photosensitive-unit drums 12 (Y, M, and C) are thereby relieved from contact with the sheet material transfer belt 10 (the photosensitive-unit drums 12Y, 12M, and 12C are spaced apart from the sheet material transfer belt 10). This prevents the image forming sections 11 for unused colors and the corresponding photosensitive-unit drums 12 from being wore out and deteriorated. In this connection, as shown in FIG. 5, suppose a distance d between a point at which a peripheral point of each of the individual aligning rollers 20a and 20b is in contact with each other and the adsorption roller 19 is, for example, 46 mm. In this case, a total length d' of the sheet material O when it is deflected and deformed at maximum is 47.5 mm in consideration of a sheet material deflection space S, which represents a space surrounded by the feed-out-side upper guide board 32a, the ejecting-side lower guide board 32b, and the adsorption roller 19. A maximum length Lp of the sheet material O that can be used by the color photocopying apparatus 101 shown in FIG. 1 is, for example, the side of 17 inch of 11×17 (inches), which is about 432 mm. Therefore, with regard to the longitudinal direction of largest usable sheet material, a maximum sheet material-deflection allowable ratio αmax at which the sheet material O can deflect at maximum in the sheet material deflection space S, is defined as $$\alpha max = (d'-d)/Lp \approx 0.35(\%).$$

Accordingly, to adjust the sheet material transportation speed in the aligning section 20, deflections of the sheet materials O must be adjusted so as to be within the sheet material deflection space S.

Figure 9:
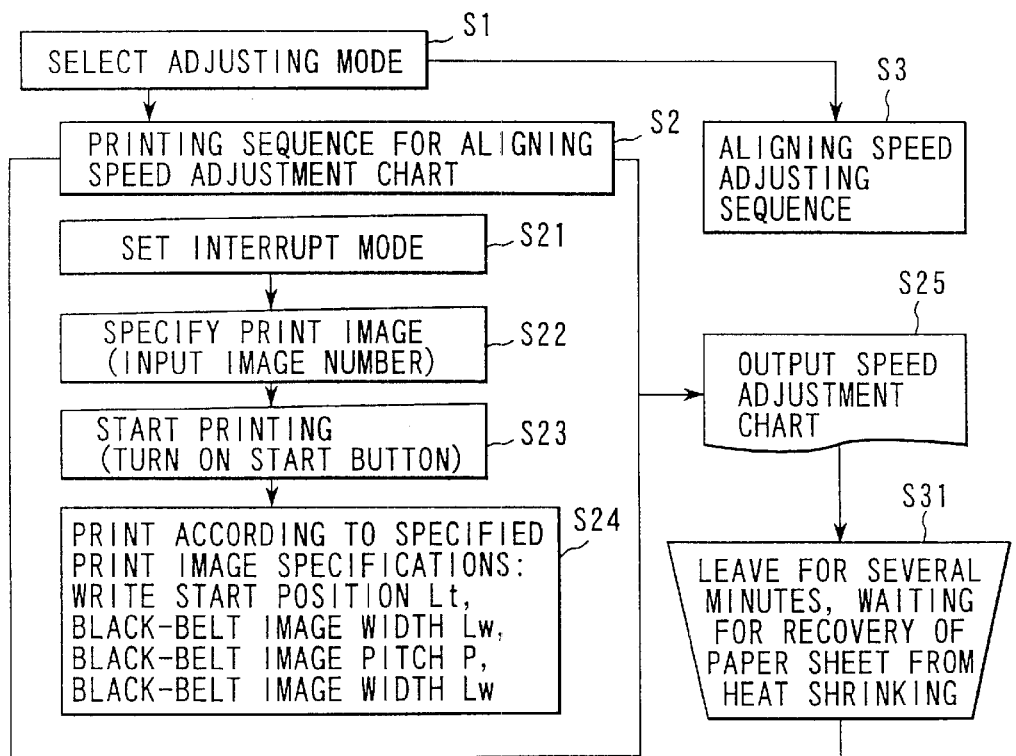
FIG. 9 is a flowchart showing a method for controlling the number of revolutions of the aligning motor in the image forming apparatus shown in FIG. 1.

Hereinbelow, according to actual adjusting operations, a description will be given of a method for controlling the number of revolutions of the aligning motor that drives the aligning rollers 20a and 20b. As shown in FIG. 9, first of all, an adjusting mode is selected (S1).

Subsequently, a print mode for a speed adjustment chart for the aligning section is selected in the adjusting mode (S2).

Figure 8:
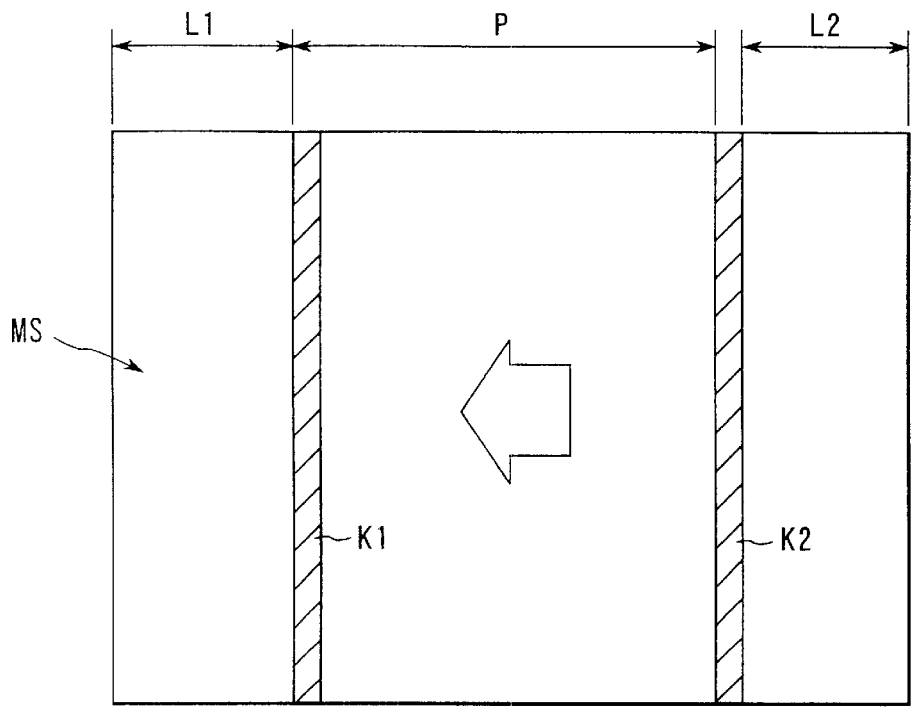
FIG. 8 is a schematic view showing a speed adjustment chart used for adjusting the transportation speed in the image forming apparatus shown in FIG. 1.

Subsequently, from the speed adjustment chart print mode, an interrupt mode is selected (S21). Then, from a menu in the interrupt mode, an image forming mode is set. The image forming mode is to output a speed adjustment chart MS on which adjustment images as shown in FIG. 8 are rendered, consisting of two black-belt images K1 and K2 (the left side is a transportation leading edge, and the left black belt is referred to as a first black-belt image K1; and the right side is a transportation tailing edge, and is referred to as a second black-belt image K2). Image data corresponding to the speed adjustment chart MS is partitioned according to image numbers and is prestored in a ROM 123. Therefore, in this particular case, only the image number is inputted using an input key 172 on a control panel 171 (S22).

Subsequently, when a start button (copy key) 173 on the control panel 171 is turned on, image forming for the chart MS is started (S23). Thereby, the chart MS on which the first black-belt image K1 having a write start position Lt and a width Lw and the second black-belt image K2 having a pitch P and the width Lw are formed (S24). Then, the toner images are fixed by the fixing unit 6 onto the sheet material O, and the fixed image is outputted (S25). The thickness Lw of each of the first and second black-belt images K1 and K2 is formed to have a thickness (width) of about 10 mm so as to be easily sensed by the OHP identifying sensor 33.

The speed adjustment chart MS on which the two black-belt images K1 and K2 are formed, formed in the described manner, is left for several minutes so as to be free of influence of heat shrinking (S31).

Hereinbelow, using the speed adjustment chart MS formed in step S21 to S25 described above, a description will be given of a transportation speed adjustment sequence for adjusting the transportation speed for the sheet materials O (S3). Subsequently, as shown in FIG. 8, an aligning speed adjustment mode is set. Various types of control in the speed adjustment mode are partitioned according to code numbers and prestored in the ROM 123. Therefore, in this particular case, only an image number is inputted using an input key on an operation panel (not shown) (S4).

In this case, in the transportation speed adjustment sequence, sheet materials having the size shorter than distances between the rotationally contacting section of the aligning rollers 20a and 20b, the sheet material transfer belt 10, and the photosensitive-unit drum 12B must be used to prevent the sheet material O either from being pulled by the black-handling photosensitive-unit drum 12B (the peripheral speed of the photosensitive-unit drum 12B is higher than the peripheral speeds of the aligning rollers 20a and 20b) or from being pushed out (the peripheral speeds of the aligning rollers 20a and 20b are higher than the peripheral speeds of the photosensitive-unit drum 12B).

With reference to FIG. 8, there occurs a case where a distance L1 from the transportation leading edge of the speed adjustment chart MS to the tailing edge of the first black-belt image K1, and a distance L2 from the tailing edge of the second black-belt image K2 to the tailing edge of the speed adjustment chart MS are varied because the speed adjustment chart MS either adheres to the sheet material transfer belt 10 or floats thereon.

To prevent output of erroneous measurement results produced by the OHP identifying sensor 33 because of the aforementioned variation in the distances, the peripheral speed of the outer periphery of a transporting roller 34 must be defined so that the speed adjustment chart MS becomes in a state of being pulled by the aligning rollers 20a and 20b and the transporting roller 34 provided in the bypass feeding section 30. For this reason, the distances L1 and L2 are individually set to be longer than the distance between the contact section of the aligning rollers 20a and 20b and the paper-transporting roller 34 (Lb-1, shown in FIG. 5).

The time difference in write timing for forming the individual black-belt images K1 and K2 corresponding to the pitch P between the first black-belt image K1 and the second black-belt image K2 is assumed to be "Tp".

Figure 10:
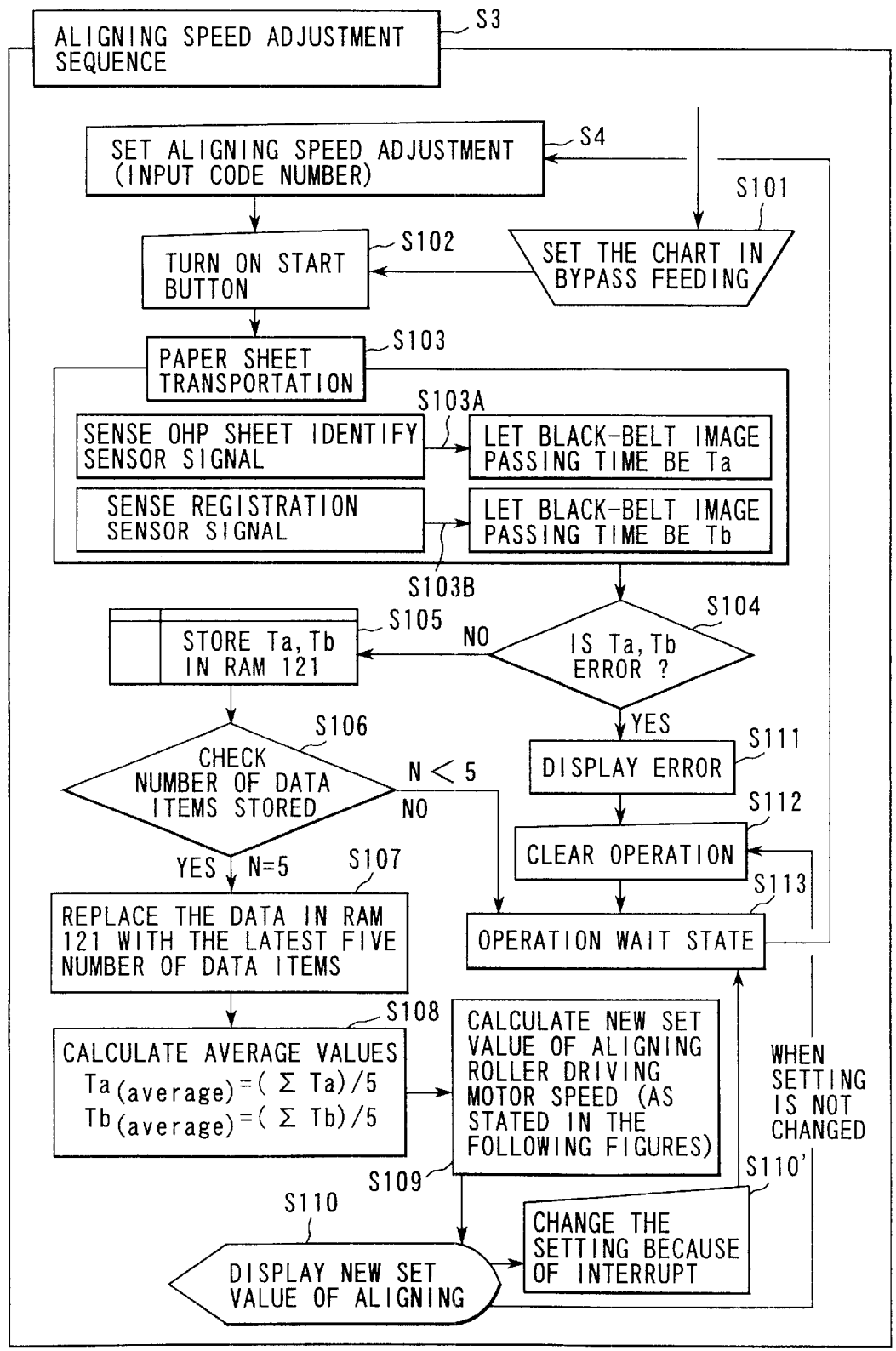
FIG. 10 is a flowchart continuing from the flowchart shown in FIG. 9, which shows the method for controlling the number of revolutions of the aligning motor in the image forming apparatus shown in FIG. 1.

Subsequently, as shown in FIG. 10, the speed adjustment chart MS, which was formed in steps S21 to S25 in FIG. 9 and has been left for several minutes, is set on the bypass feeding section 30 (S101), and the start button 172 on the control panel 171 is turned on (S102). The speed adjustment chart MS, that is, the black-belt images K1 and K2, need not be created, and a dedicated chart (not shown) on which two black-belt images preformed may instead be used. However, the arrangement allowing the color photocopying apparatus 101 to create the speed adjustment chart MS for its own use produces advantages. For example, it avoids necessity for consideration of influence of, for example, moisture adsorption, which causes deterioration in the accuracy of the speed adjustment chart MS. Other advantages are such that the speed adjustment chart MS need not be hand-carried for performing maintenance/inspection (may be overlooked to be hand-carried); and even when the speed adjustment chart MS is damaged, it can be re-created and prepared any time when it is used.

When the start button 172 is turned on in step S102, transportation of the speed adjustment chart MS set in the bypass feeding section 30 is started with one end on the side of the black-belt image K1 and is performed toward a transportation route, that is, the aligning section 20 (S103).

Subsequently, regarding the speed adjustment chart MS being transported in step S103, with respect to the time from when the first black-belt image K1 is fed in until the second black-belt image K2 is fed in (or, the time from when the tailing edge of the black-belt image K1 passes until the tailing edge of the black-belt image K2 passes), states where it has passed through the OHP identifying sensor 33 and the registration sensors 21 are individually sensed (S103A and S103B).

According to the outputs from the individual sensors 33 and 21, black-belt image passing times Ta and Tb can be obtained. In this case, the value of measurement by the OHP identifying sensor 33 is represented by Ta, and the value of measurement by the registration sensor 21 is represented by Tb.

Determination is performed whether or not the measurement values Ta and Tb thus obtained are abnormal times (measurement errors) (S104). If the times are determined to be normal values (S104-NO), they are individually recorded in the RAM 121 as similar values of the sheet material transportation speed Va in the aligning section 20 and the sheet material transportation speed Vb on the sheet material transfer belt 10 (S105).

In consideration of the deviation (variation) in the speed at which the sheet materials O passing through the aligning section 20 are transferred, steps S101 to S105 are repeated multiple times, for example, five times. Repeatedly obtained values Ta and Tb are partitioned and stored in the RAM 121. At this time, the maximum number of items of the measurement data is five, that is, for five times.

At step S106, if five pieces of Ta and Tb are obtained, an averaging sequence is started, and the five data items stored in the RAM 121 are replaced by the latest five data items (S107). Also, according to $$Ta_{(average)} = (\Sigma Ta)/5 \text{ and}$$

$$Tb_{(average)} = (\Sigma Tb)/5,$$

average values of Ta and Tb are obtained (S108).

Subsequently, using the number of revolutions of the aligning motor that rotates the aligning roller, which has been obtained in step S108, as a target, the movement speeds of the outer peripheral faces of the aligning rollers 20a and 20b, that is, a measurement value represented by a number of revolutions $N_{(new)}$ of the aligning motor 20 m, newly sets the number of revolutions of the aligning motor 20 m, which can be obtained in the following expression (1) (a current number of revolutions is represented by $$N_{(current)}; \text{S109}):$$

$$N_{(new)} =$$

Current aligning motor number of revolutions×target aligning paper transportation speed/current aligning paper transportation speed $$= N_{(current)} \times (P/Tb \times (1+\alpha))/(Pa/Ta)$$

(Note: "α" represents the median of the aforementioned αmax to 0%; it is 0.18% in this case)

$$= N_{(current)} \times (Ta \times (1+\alpha))/Tb \quad (1)$$

Figure 11:
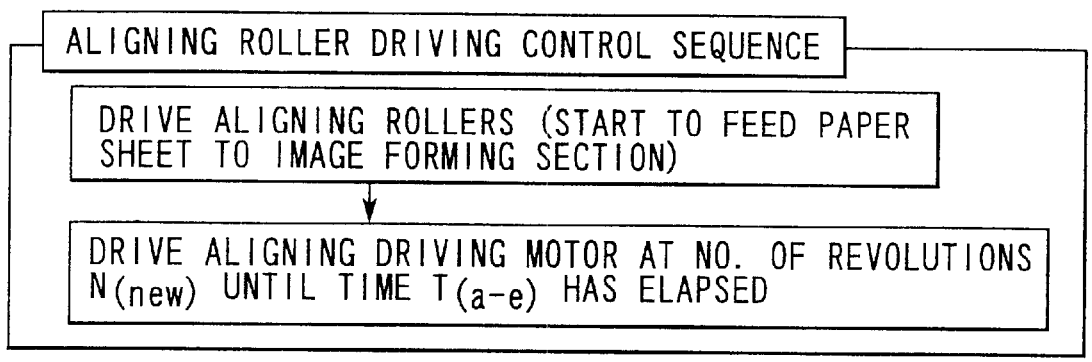
FIG. 11 is a flowchart showing a procedure for modifying a current number of revolutions to the number of revolutions of the aligning motor, which is obtained in the method shown in FIGS. 9 and 10.

Subsequently, the new number of revolutions $N_{(new)}$ of the aligning motor 20 m, obtained in step S109, is inputted to an aligning motor driver 301 (S110). Specifically, as shown in FIG. 11, the aligning motor 20 m for driving the aligning rollers 20a and 20b is rotated in the time from when the leading edge of the sheet material O passes through the contact portion of the aligning rollers 20a and 20b until the tailing edge of the sheet material O is discharged, the time being represented by $T_{(a \text{ to } e)}$, and at the new number of revolutions $N_{(new)}$ obtained from the expression (1).

By using the expression (1), the relative difference between the sheet material transportation speed Va in the aligning section 20 and the sheet material transportation speed Vb on the aligning section 20 can be adjusted to be within an appropriate relative speed range that allows the sheet materials O to be transported within an allowable deflection amount range of the sheet material O in the sheet material deflection space S. Particularly, in the color mode, the above allows color deviation to be prevented.

At stem S104, if the passing-through time of the black-belt images K1 and K2 is not outputted from the OHP identifying sensor 33 and/or the registration sensors 21 because of problems such as that the sheet materials O are jammed in transportation, or if an apparent detection error or the like is found in outputs obtained from the individual sensors (S104-Y), the error is notified to the main control unit 111 (S111), and processing enters a state of input wait for accepting a clearing input (S112). The input wait accepting the clearing input is concurrently used as input wait in a case where the new number of revolutions $N_{(new)}$ obtained at the individual steps for modification of the number of revolutions of the aligning motor 20 m described earlier is not employed.

Subsequently, in the input-wait state (S112), if "N=5" cannot be counted in step S106 because of problems such as that a measurement setting mode is interrupted and the sheet materials O are jammed on the way of transportation (S106-N), and if the new number of revolutions $N_{(new)}$ obtained in the individual steps for modifying the number of revolutions of the early-described aligning motor 20 m is modified again (S110'), processing enters a state of operation wait for accepting input of the measurement setting mode (S113).

Figure 12:
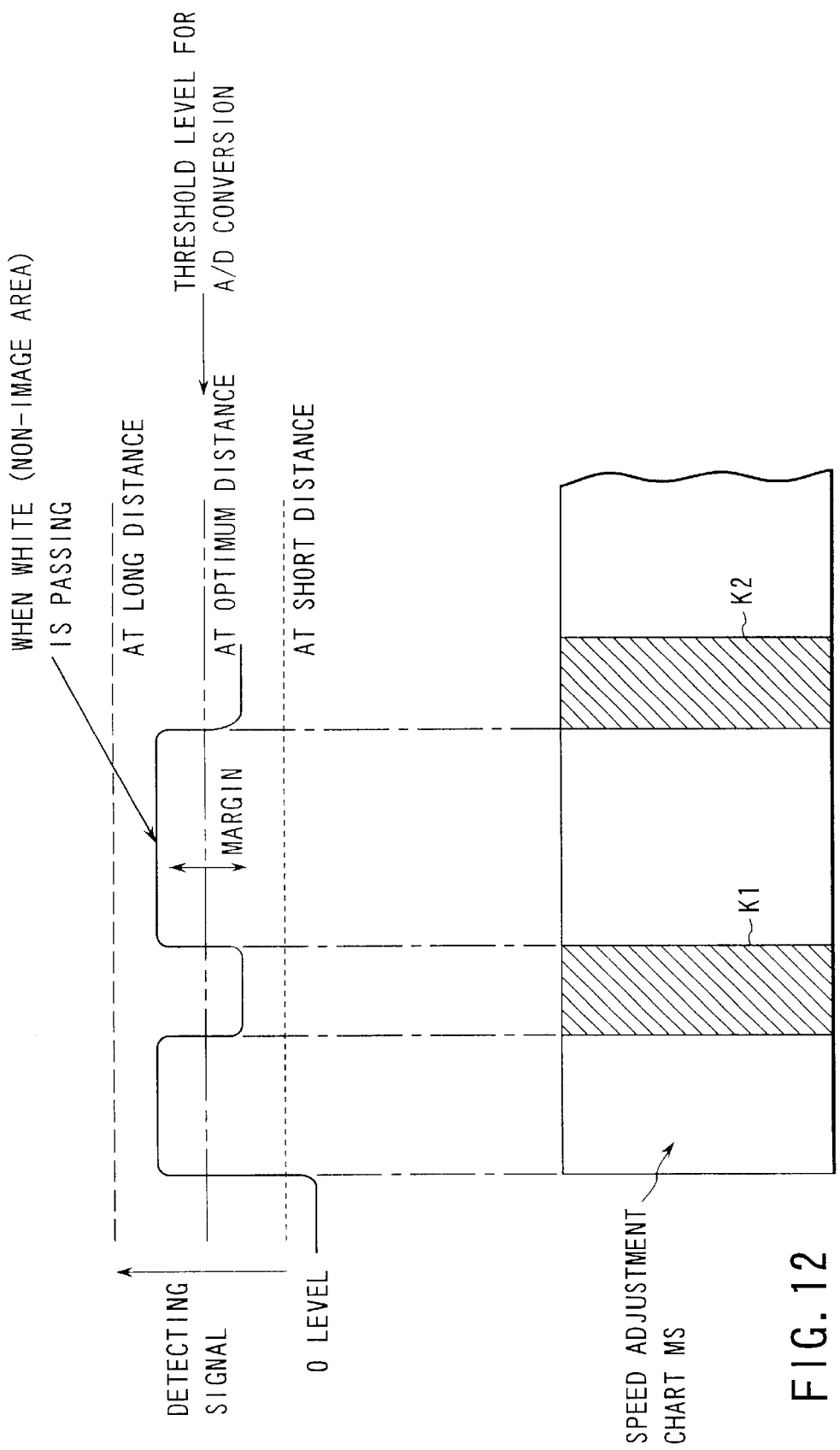
FIG. 12 is a schematic view showing output characteristics of an OHP-identifying sensor installed in the image forming apparatus shown in FIG. 1.

However, even when the speed adjustment chart MS having the above-described black-belt images K1 and K2 is used, as shown in FIG. 12, according to the detecting capability of the OHP identifying sensor 33, there are cases where output signal levels cannot be identified because of interobject differences (variation) caused by combination of a photoemitter element and a photoreceptor element (of the OHP-identifying sensor). For example, when the sheet material O is a piece of unused paper, the level of a signal outputted when a white portion (base surface) is detected cannot be identified from the level of a signal outputted when the distance between the OHP identifying sensor 33 and the sheet material O is relatively large. Also, for example, the level of a signal outputted when a black-belt image is detected cannot be identified from the level of an output signal outputted when the distance between the OHP identifying sensor 33 and the sheet material O is relatively small.

Figure 13:
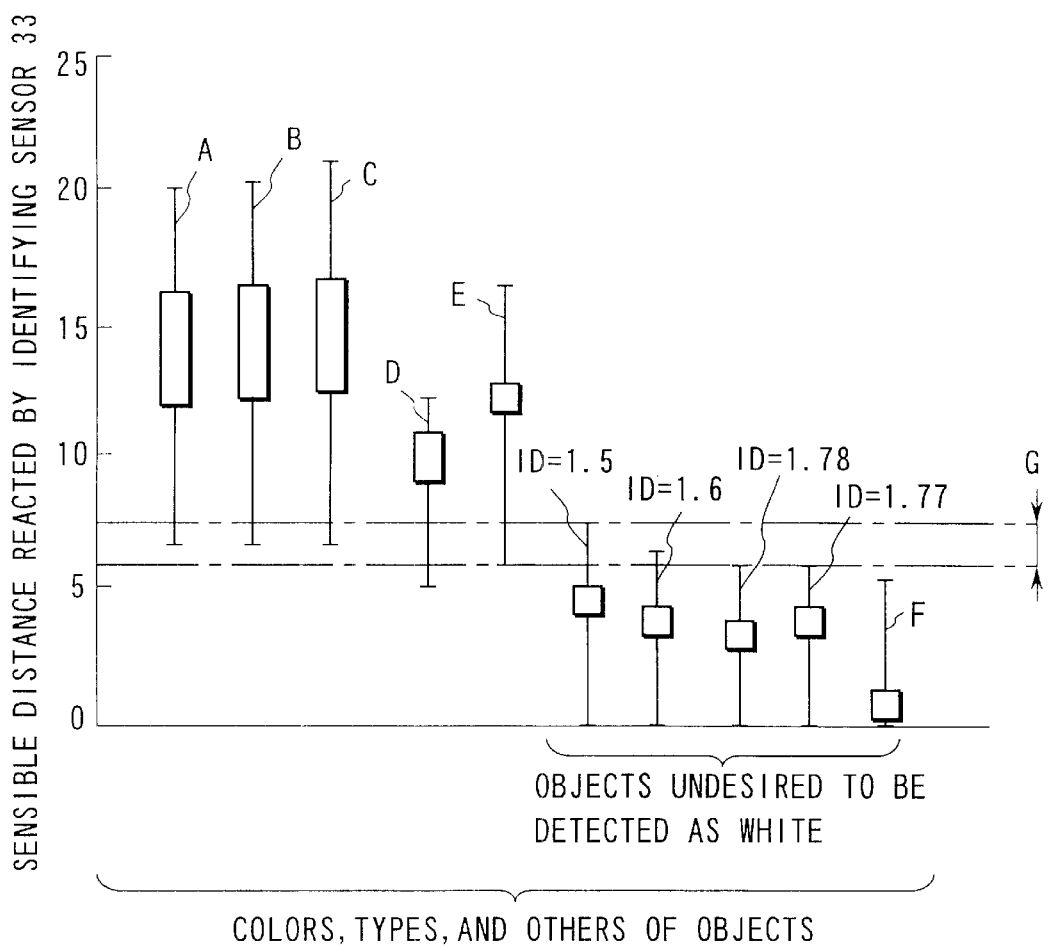
FIG. 13 is a schematic view showing interobject differences in characteristics of the OHP-identifying sensor installed in the image forming apparatus shown in FIG. 1.
Figure 14:
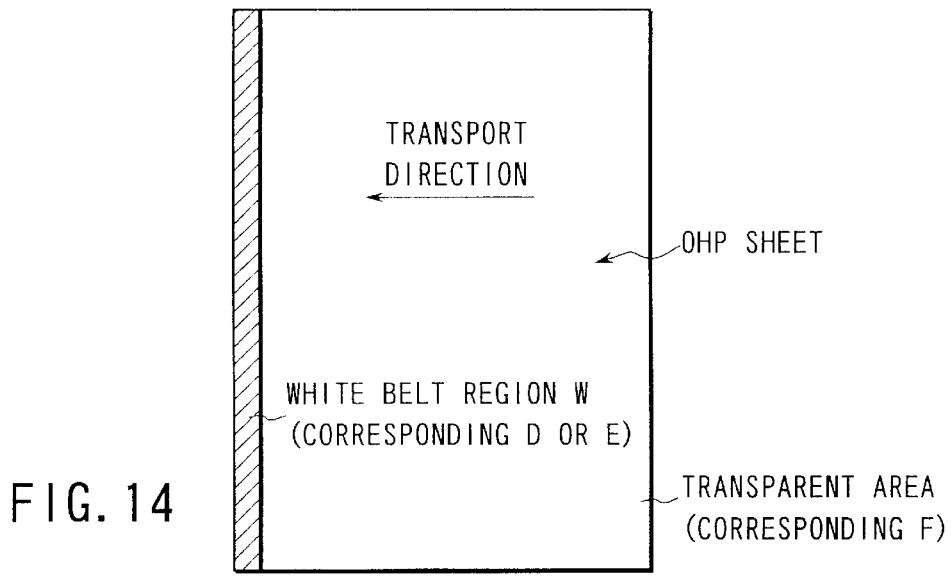
FIG. 14 is a schematic view showing an example identifying white belt provided on an OHP sheet used in the image forming apparatus shown in FIG. 1.

In connection with the detecting capability of the OHP identifying sensor 33, FIG. 13 shows the interobject differences (variation), as shown in FIG. 12, in more detail, which are caused due to the combination of a photoemitter element and a photoreceptor element (of the OHP-identifying sensor). The figure shows results of detection of distances sensible to the OHP identifying sensor 33, the detection having been performed by changing the heights of the sensor, for reflection from base surface sections of individual print sheet paper samples "A", "B", and "C"; reflection from black images of four different densities, formed on an arbitrary sheet paper, reflection from identifying white images "D" and "E" that have been provided on an example OHP sheet as shown in FIG. 14; and reflection from a transparent section "F" of the OHP sheet. The distances each represented by a void belt region among the individual ling segments, i.e., in the sensible distances on which the OHP identifying sensor 33 reacts show ordinary values. The distances longer than the void belt regions show results of detection (upper-limit values in variation (interobject differences)) performed by an upper-limit sensor having a high detecting capability; whereas, the distances shorter than the void belt regions show results of detection (lower-limit values in variation (interobject differences)) performed by an sensor having a low detecting capability, which have been continuously used for five years and the emitting intensity of its photoemitter element has thereby been deteriorated to a level of 50% with respect to an initial value. Among the object types, the sheet paper samples A, B, and C and the identifying white images D and E require high reflectances; therefore, as an apparatus system, they must always be identified (sensed) as sheet papers.

As shown in FIG. 13, the level of the signal outputted from the OHP identifying sensor 33 varies to be high for any one of the papers A, B, and C while the base surface section (relatively white) of the speed adjustment chart MS passes; whereas, the level varies to be low for any one of the samples of image densities 1.5, 1.6, 1.78, and 1.77 while the black-belt image passes. The level of the output signal issued when detection is performed with the same OHP identifying sensor 33 for the passing OHP sheet varies to be high for the identifying white-belt sections D and E, but varies to be low for the transparent (base surface) section F.

However, as is apparent from FIG. 13, a case can be recognized in which the output corresponding to the OHP identifying white-belt section "F" varies to be the same as the output corresponding to the black-belt section of the chart MS. The range pointed by an arrow G is a range in which erroneous detection identification is caused because of predominantly determining apparatus-side factors, such as errors in installation of the OHP identifying sensor 33.

Generally, to allow the above-described variation to meet detection conditions that properly function, either the luminous current of the OHP identifying sensor 33 is adjusted or the sensitivity of the photoreceptor element is adjusted. Since the aforementioned adjustment is an analog-type adjustment, it must be performed (by operators) as a manual-operating step, thereby increasing the manpower in apparatus-assembly steps.

Figure 15:
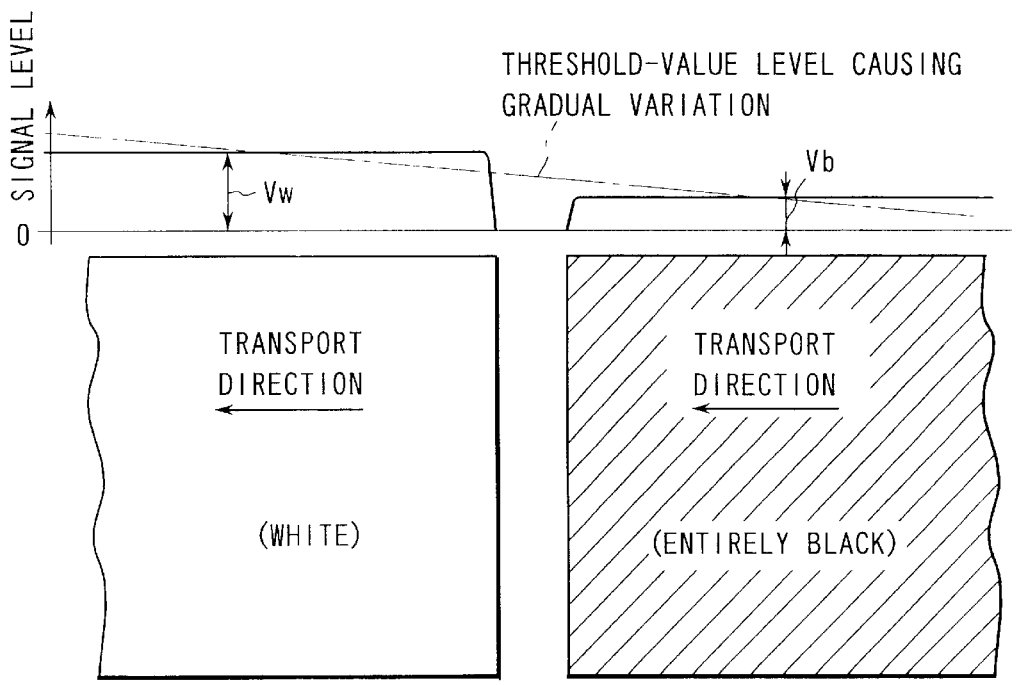
FIG. 15 is a schematic view showing an example for obtaining an output and white-base non-image area for a high density area from an output of the OHP-identifying sensor, the area corresponding to an example image pattern of an adjustment chart used for setting a threshold value of the OHP-identifying sensor in the image forming apparatus shown in FIG. 1.
Figure 16:
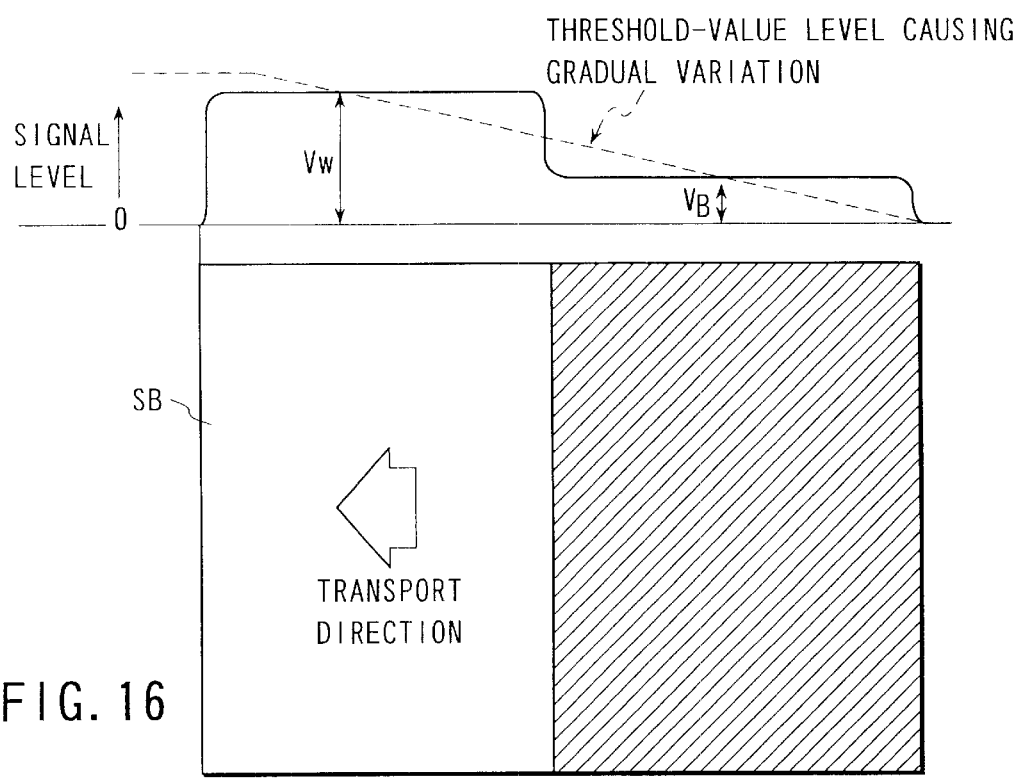
FIG. 16 is a schematic view showing an example for obtaining an output and white-base non-image area for a high density area from an output of the OHP-identifying sensor, the area corresponding to an example image pattern of an adjustment chart used for setting threshold values of the OHP-identifying sensor in the image forming apparatus shown in FIG. 1.
Figure 17:
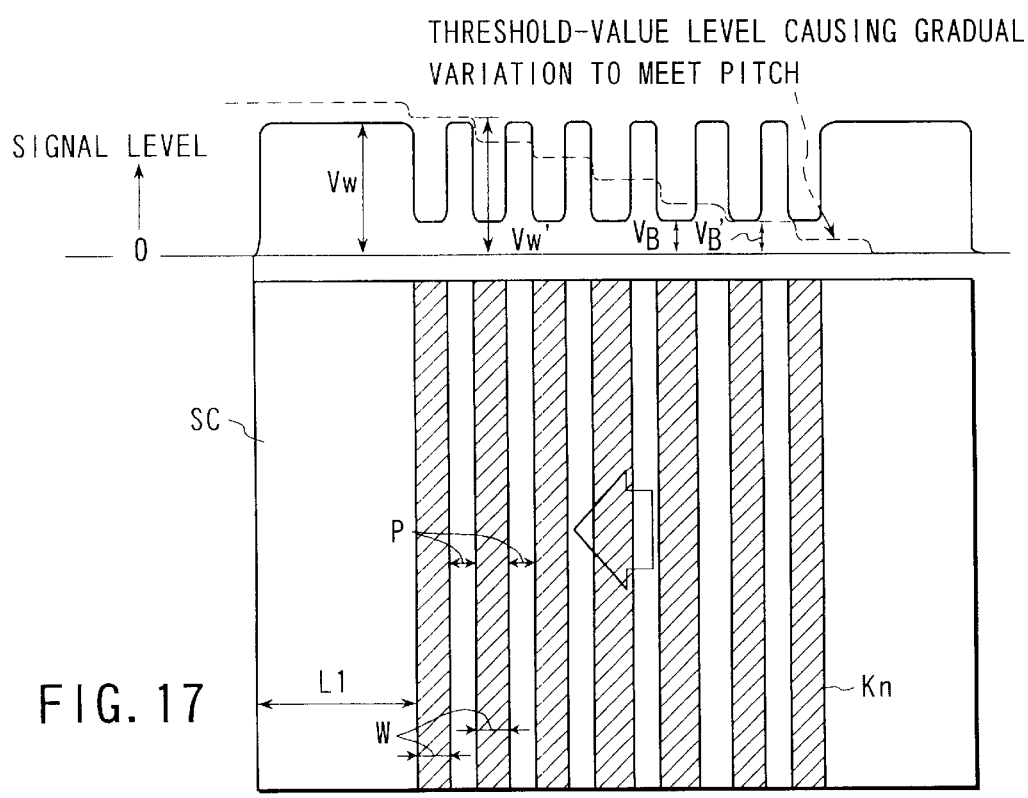
FIG. 17 is a schematic view showing an example for obtaining an output and white-base non-image area for a high density area from an output of the OHP-identifying sensor, the area corresponding to an example image pattern of an adjustment chart used for setting threshold values of the OHP-identifying sensor in the image forming apparatus shown in FIG. 1.

To solve the described problems, adjustment charts SA, SB, and . . . having various image patterns, as shown in FIGS. 15 to 17, are created by the apparatus main unit 101. Then, the created adjustment charts SA, SB, and . . . are used to obtain an analog output Eab for the high density area among outputs of the OHP identifying sensor 33, and an analog output Eaw for a white non-image area, which has no formed image, among the outputs of the OHP identifying sensor 33. In this case, an automatically-and-gradually varying program for varying a threshold value little by little (gradually) is used. A median value Eam of the individual outputs obtained as above is set as a threshold value, thereby allowing passage of the OHP sheet to be securely detect during the transportation of the OHP-using transparent sheet. The reason for using the threshold value as an object of adjustment is that programming allows the value to be digitally controlled. The chart SB shown in FIG. 16 is a sheet paper designed such that a front-half section in the paper-transportation direction is in an original white state, and a write start position is formed on the rear half from Lt. The chart SC shown in FIG. 17 is a sheet paper on which a plurality of black-belt images are formed in the direction perpendicular to the paper-transportation direction; specifically, there are formed the first black-belt image K1 having the write start position Lt and the width Lw, the second black-belt image K2 having the pitch P and the width Lw for the first black-belt image K1, . . . , and an n-th black-belt image Kn having the pitch P and the width Lw for an n−1-th black-belt image for an black-belt image Kn−1.

Figure 18:
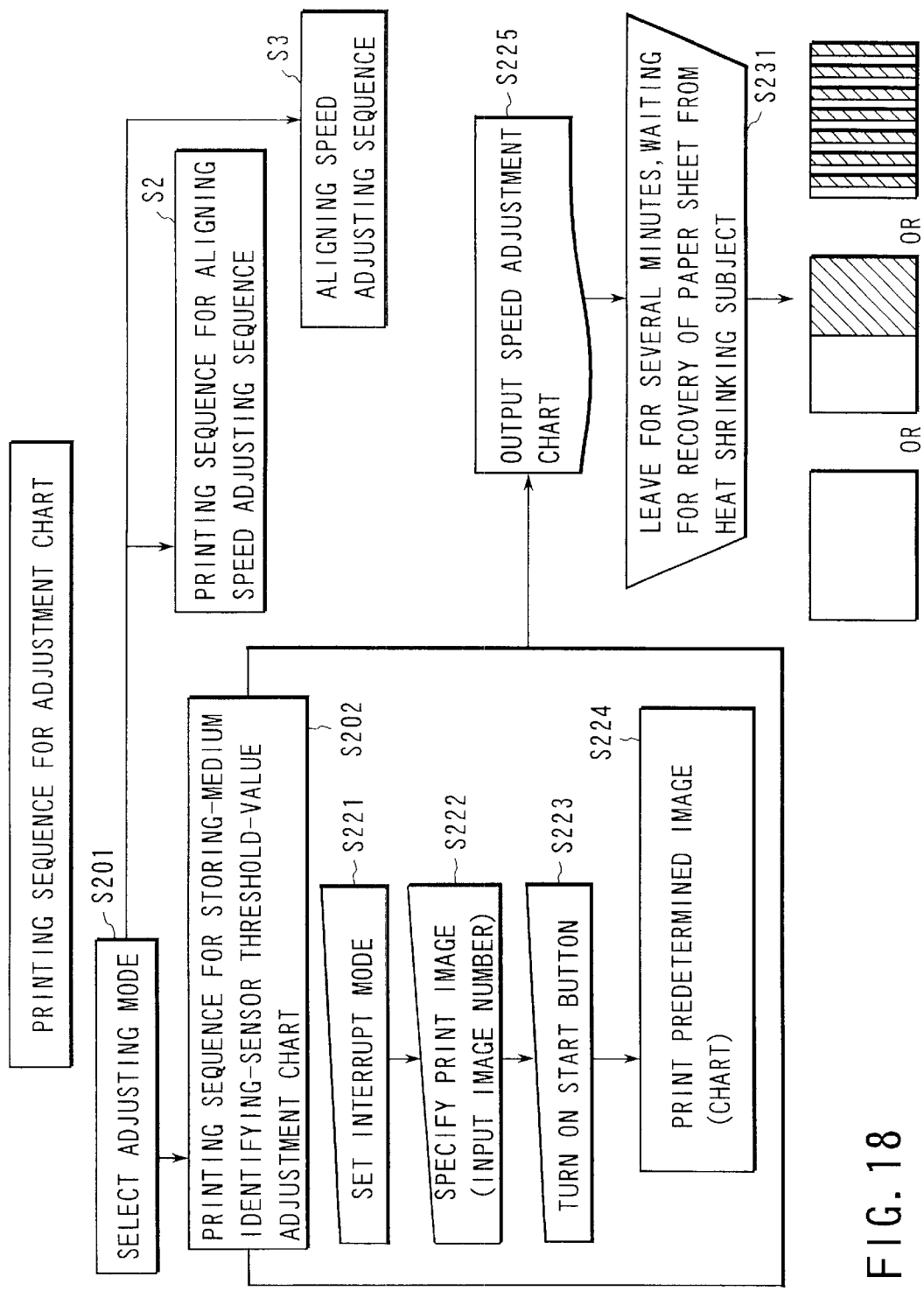
FIG. 18 is a flowchart for outputting the adjustment charts shown in FIGS. 15 to 17.

As shown in FIG. 18, first of all, an adjusting mode is selected (S201).

Subsequently, a print mode for an OHP identifying threshold value adjustment chart is selected in the adjusting mode (S202).

Subsequently, an interrupt mode is selected in a speed adjustment chart print mode (S221).

Subsequently, specification is made from a menu in the interrupt mode for an image forming mode that outputs the threshold-value adjustment chart SA on the whole of which the black image is formed, as shown in FIG. 15. Image data corresponding to the adjustment chart SA is partitioned according to image numbers and is prestored in the ROM 123; therefore, in this particular case, only the image numbers is inputted using the input keys on the control panel 171 (S222).

Subsequently, when a start button (copy key) 173 on the control panel 171 is turned on, image forming for the chart SA is started (S223). Thereby, the chart SA that is wholly black is formed (S224). Then, the toner image is fixed by the fixing unit 6 onto the sheet material O, and the fixed image is outputted (S225).

The adjustment chart SA, on the whole of which the black image is formed as mentioned above, is left for several minutes so as to be free of influence of heat shrinking (S231). The other charts SB, . . . , and . . . , as shown in FIGS. 16 and 17, are similarly formed. The chart SB shown in FIG. 16 is a sheet paper designed such that a front-half section in the paper-transportation direction is in an original white state, and a write start position is formed on the rear half from Lt. The chart SC shown in FIG. 17 is a sheet paper on which a plurality of black-belt images are formed in the direction perpendicular to the paper-transportation direction; specifically, there are formed the first black-belt image K1 having the write start position Lt and the width Lw, the second black-belt image K2 having the pitch P and the width Lw for the first black-belt image K1, . . . , and an n-th black-belt image Kn having the pitch P and the width Lw for an n−1-th black-belt image for an black-belt image Kn−1. The chart SC is formed such that, for example, when the transportation speed for the sheet materials O, that is, the movement speed of the sheet material transfer belt 10 is 100 mm/sec, the first black-belt image K1 is formed on the leading edge of the sheet material O with timing equivalent to the time after the passage of 0.1 second; the second black-belt image K2 is formed after the passage of 0.1 second to have the width equivalent to 0.1 second; . . . ; and, similarly, the n-th black-belt image Kn is formed.

Subsequently, using the threshold-value adjustment charts SA (or SB or SC) formed in the above-described steps S221 to S225 and according to a control block schematically shown in FIG. 19, an analog output Eb among outputs of the OHP identifying sensor 33 and an analog output Ew among the outputs of the same OHP identifying sensor 33 are obtained. The analog output Eb is relevant to the high density area, and the analog output Ew is relevant to the white non-image area where no image is formed. To obtain these analog outputs, the automatically-and-gradually varying program is used. The program varies a threshold value little by little.

Figure 19:
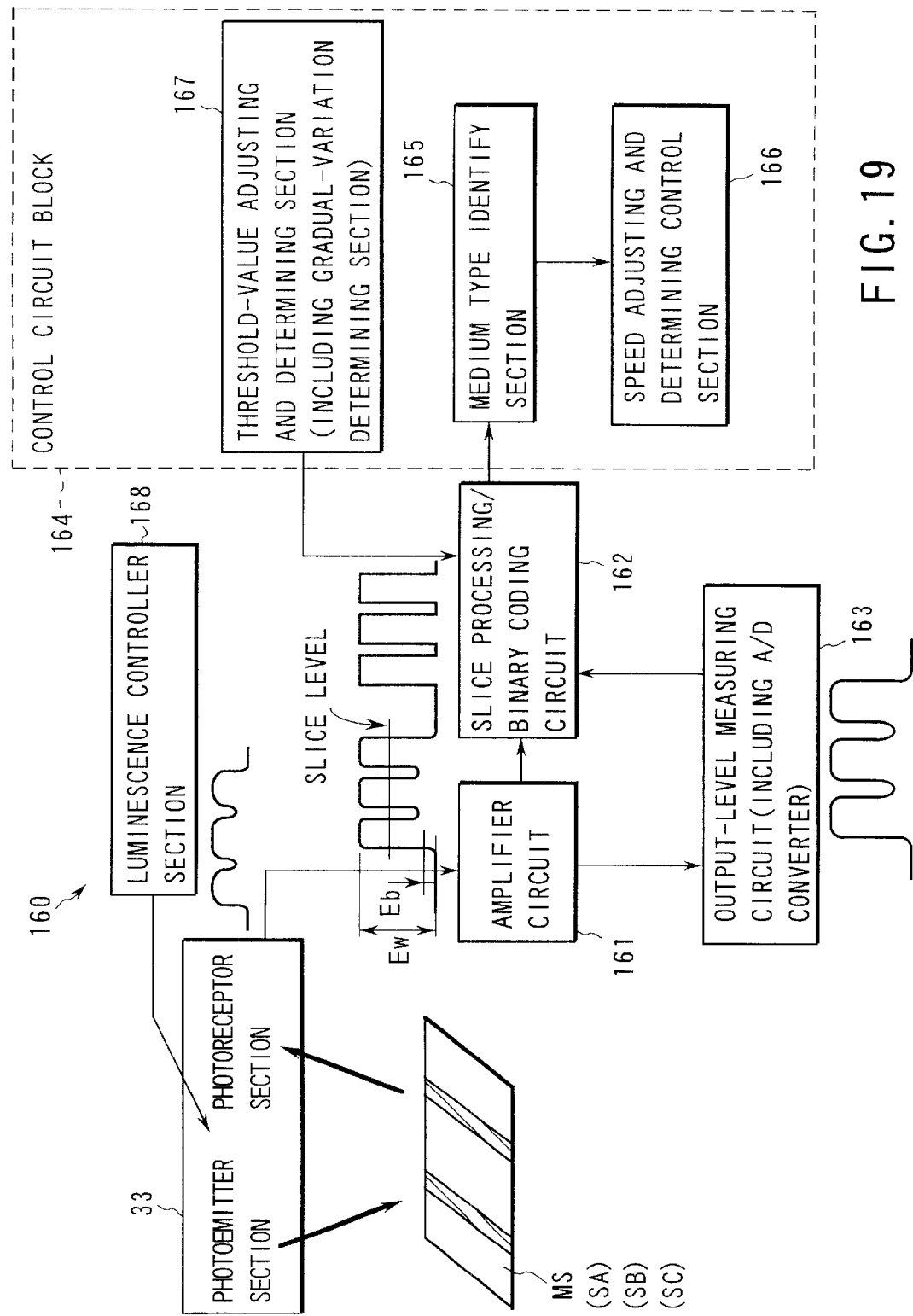
FIG. 19 is a flowchart showing another method for controlling the number of revolutions of the aligning motor in the image forming apparatus shown in FIG. 1.

FIG. 19 is a schematic view showing an identify circuit 160 that identifies the type of image transcription media according to outputs of the OHP identifying sensor.

Outputs of the OHP identifying sensor 33 are amplified by amplifier circuit 161 to a predetermined level. The amplified outputs are inputted to a slice processing/slice-processing binary coding circuit 162 and an output-level measuring circuit 163 comprising an A/D converter. Digital signals outputted from the output-level measuring circuit 163 are inputted to the slice processing/slice-processing binary coding circuit 162. In other words, threshold values of the OHP identifying sensor 33 are defined according to the high density image section level and the non-image section level among the pre-binary-coded analog outputs outputted by the OHP identifying sensor 33.

Outputs of the slice processing/slice-processing binary coding circuit 162 are sequentially inputted to a transcription-medium-type identifying section 165 in a control circuit block 164 and a speed-adjustment setting control section 166.

Outputs of the transcription-medium-type identifying section 165 are inputted to a threshold-value adjusting section 168. The threshold-value adjusting section 168 includes an automatically-and-gradually varying section for gradually varying threshold values of the OHP identifying sensor 33 to define the threshold values of the OHP identifying sensor 33.

According to the above, threshold values of the OHP identifying sensor 33 are optimized after signal levels are measured in the output-level measuring circuit 163. However, for the optimization, a different method may be such that emitting timing of the OHP identifying sensor 33 is subjected to gradual-varying control of a light-emission control section 167, and the threshold values of the OHP identifying sensor 33 are thereby tested and defined. In this particular case, both circuit blocks are shown for convenience.

Figure 20:
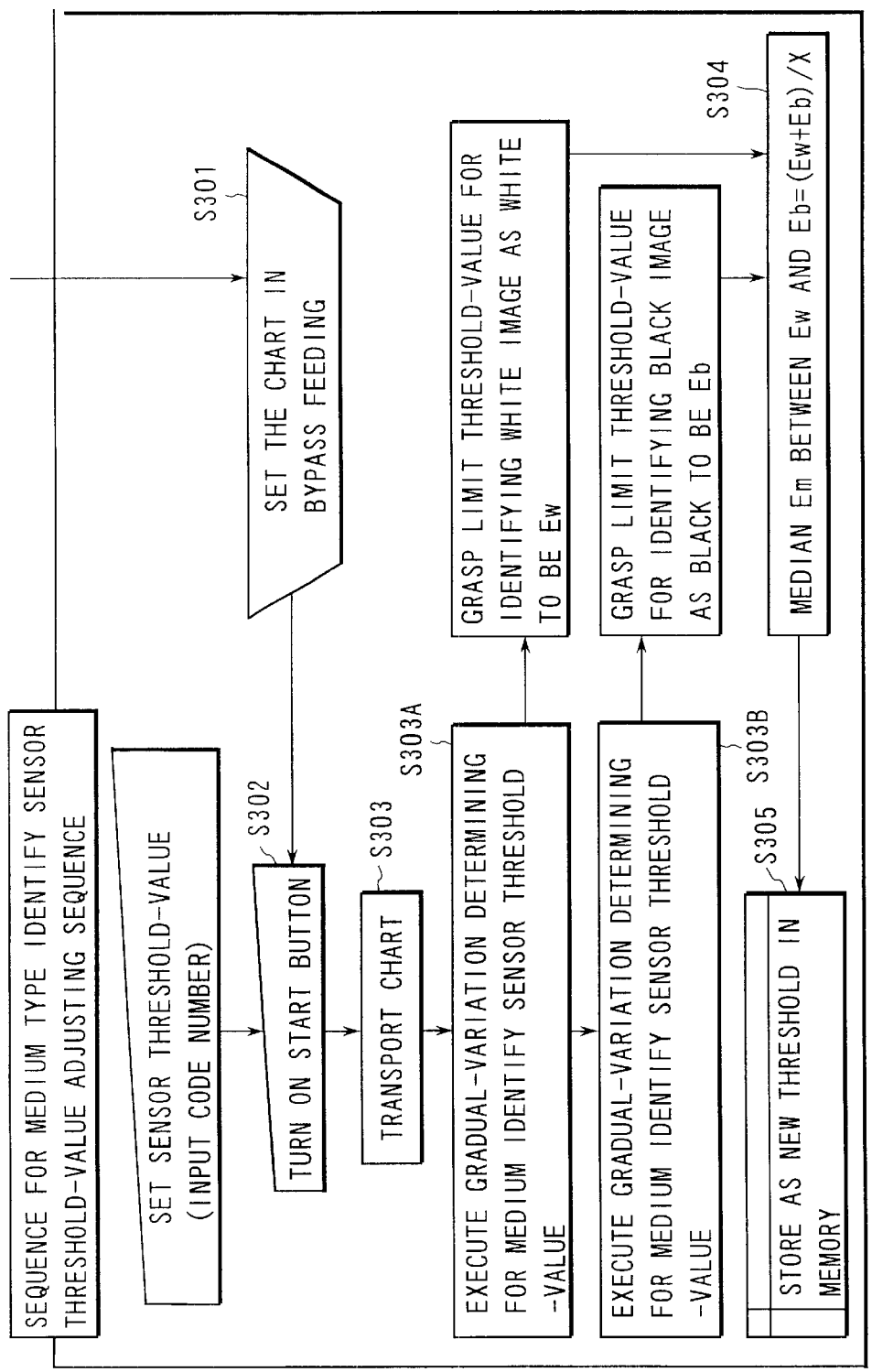
FIG. 20 is a flowchart showing a method for setting threshold values of the OHP-identifying sensor, continuing from the flowchart shown in FIG. 18.

FIG. 20 shows a flow of an algorithm for a method that performs gradual-varying control for threshold values.

The threshold-value adjustment chart SA (or SB or SC), formed as shown in FIG. 18, is set in the bypass feeding section 30 (S301), and the start button 172 of the control panel 171 is turned on (S302). According to steps described below, using all the threshold-value adjustment charts SA, SB, and SC allows threshold values to be adjusted most accurately; however, using only one or two of the charts still allows threshold values of the OHP-identifying sensor to be adjusted.

When the start button 172 is turned on, the threshold-value adjustment chart SA (or SB or SC), set in the bypass feeding section 30 is fed, with a predetermined portion the chart as the leading edge, toward the transportation route of the apparatus 101, that is, toward the aligning section 20 (S303).

Subsequently, for the threshold-value adjustment chart SA (or SB or SC) being transported in the vicinity of the OHP identifying sensor 33, high density images and low density images are detected by the OHP identifying sensor 33 and according to the described automatically-and-gradually varying program (S303A and S303B).

Subsequently, the outputs from the OHP identifying sensor 33 are averaged. This allows the provision of a limit threshold value Ew (white-image threshold value) and a limit threshold value Eb (black-image threshold value). The limit threshold value Ew allows the non-image section to be identified to be white, and the limit threshold value Eb allows high density section image densities to be black. According to these two limit threshold values, a median value Em (Em=(Ew+Eb)/x (x represents a threshold value distribution ratio obtained by experiments), for example, 2) can be obtained (S304).

The median value Em thus obtained is stored in memory 199 as a new threshold value (S305).

Since multiple types of charts as represented by, for example, charts SA and SB, are used and, the steps (S303A and S303B) shown in FIG. 20 are modified as described below according to the charts SA, SB, and . . . shown in FIGS. 15 to 17.

The chart SA in FIG. 15 is simply a black image; therefore, as long as the chart SA is used, a new white sheet paper is prepared and is first fed into the apparatus, and then, the chart SA is fed into the apparatus.

As shown in parallel in FIG. 15, during the transportation of the white sheet paper, an output at Vw can be obtained from the OHP identifying sensor 33. Also, during the transportation of the chart SA, an output at Vb that is lower than Vw can be obtained from the OHP identifying sensor 33. At this time, while threshold values of the OHP identifying sensor 33 are automatically and gradually varied using the described automatically-and-gradually varying program, they are grasped at levels matching the individual outputs to be Ew and Eb.

Similarly, when the chart SB shown in FIG. 16 is used, the chart SB is fed with its white image section as the leading edge into the apparatus 101. Therefore, as shown in parallel in FIG. 16, during the transportation of the precedent white image, an output at vw is produced from the OHP identifying sensor 33; and during the transportation of the black image section, an output at Vb that is lower than Vw can be obtained from the OHP identifying sensor 33. At this time, while threshold values of the OHP identifying sensor 33 are automatically and gradually varied using the described automatically-and-gradually varying program, they are grasped at levels matching the individual outputs to be Ew and Eb.

When the chart SC shown in FIG. 17 is used, as shown in parallel in FIG. 17, an output at Vw is outputted for the equivalence to the width (section) corresponding to the first black-belt image K1 in the write start position Lt of the chart SC. For the time corresponding to the pitch P between the image and the second black-belt image K2, an output at Vb that is lower than Vw can be obtained from the OHP identifying sensor 33. For the chart SC, the aforementioned Vw and Vb are alternately outputted at the pitch P for images up to an n-th black-belt image Kn. As long as this case is concerned, as shown in the figure, threshold values are varied every time corresponding to the pitch P, the described automatically-and-gradually varying program thereby grasps the threshold values to be Ew and Ev at levels matching the individual outputs.

In this case, as shown in FIG. 13, the white-surface detection level varies depending upon the type of the sheet material O. For this reason, the threshold values of the OHP identifying sensor 33 may be defined by using an optimum threshold value distribution ratio a obtained from experiments (which can be obtained from FIG. 11) and according to the expression (Eab+Eaw)/α for each type of the sheet material O.

Incidentally, there are OHP sheets represented by that shown in FIG. 14. The OHP sheet has a prearranged white-belt image W identifying itself as an OHP sheet. In this case, threshold values of the OHP identifying sensor 33 are set to a median value Eom that can be obtained by performing calculation using an analog outputs Eob and Eow among outputs of the OHP identifying sensor 33. The analog output Eob is relevant to the transparent section (base surface) of the OHP sheet, and the analog output Eow is relevant to the white-belt image of the OHP sheet. The above way allows the OHP sheet to be securely detected even when the sheet material O is a transparent OHP sheet for use with OHPs. Also in this case, similarly to the case described using in FIG. 13, the threshold values of the OHP identifying sensor 33 may be defined by using the optimum threshold value distribution ratio α obtained from experiments and according to the expression (Eab+Eaw)/α for each type of the sheet material O.

Also when both the OHP sheet having the white-belt image W for identification, as shown in FIG. 14, and the sheet paper are used, threshold of the OHP identifying sensor 33 are set to Em that can be obtained by performing calculation using analog outputs described below among those of the OHP identifying sensor 33. The analog outputs are an output Eb (output from one of the two areas, of which the reflectance is higher) that produced a higher output in the analog outputs Eob relevant to the transparent section of the OHP sheet and the analog output Eab relevant to the high-density area formed on the sheet paper, and an output Ew (output from one of the two areas, of which the reflectance is lower) that produced a lower output in the analog output Eaw relevant to the base surface in the non-image area of the OHP sheet and the analog output Eow relevant to the white-belt image of the OHP sheet. The above way allows the adjustment to be performed even more securely. Also in this case, similarly to the case described using in FIG. 13, the threshold values of the OHP identifying sensor 33 may be defined by using the optimum threshold value distribution ratio a obtained from experiments and according to the expression (Eab+Eaw)/α for each type of the sheet material O.

As described above, the color image forming apparatus of the present invention creates the individual adjustment charts, retransports the charts, and automatically varies the sensing threshold value level. Therefore, even with an optical sensor that may cause identification errors, the type of sheets and speed adjustment image sections can be accurately detected. Even more accurate detection can be performed by implementing the following: one of a detection output equivalent to a black image on a test chart and a detection output equivalent to a transparent section of an OHP sheet is used as first data, one of a detection output equivalent to a white image on the test chart and a detection output equivalent to an identification white image on the OHP sheet is used as a second data, and threshold values of the optical sensor that allows white images and black images to be accurately identified are defined in relation to the individual detection outputs.

In addition, according to times in which the white-belt image on the test chart and the black-belt image thereon, optimum sheet material transportation speeds can be defined.

As described above, according to the present invention, relative differences between the supplying unit and the image forming units can be adjusted into the appropriate relative speed range that meets the allowable sheet material deflection amount in the deflection allowable space. Furthermore, black/white information (identification marks) on the sheet materials being transported at the aforementioned speeds can be securely detected; and particularly, occurrence of color deviation in the color mode can be minimized.

Accordingly, the color image forming apparatus that can output color images without color deviation and jitter can be provided.

What is claimed is:

1. An image forming apparatus comprising:
    image forming means for forming images by using developer;
    supplying means for feeding image formation media toward the image forming means;
    transporting means for transporting the image formation media that have been fed;
    transferring means for transferring developer images formed on the image forming means onto the image formation media;
    identifying means for performing identification of the type of the image formation media;
    transportation speed adjusting means for performing adjustment of the speed of transportation by the supplying means for the image formation media, the adjustment being performed according to outputs from the identifying means; and
    identification reference adjusting means for adjusting a reference value E used for identification of the image formation media, the identification being performed by the identifying means,
        wherein a sequence for adjustment of the reference value E is executed by the identification reference adjusting means, and identification is thereby implemented for the type of adjustment sequences that are executed by the transportation speed adjusting means for the speed of transportation of the image formation media and the type of the image formation media,
        wherein the identification reference adjusting means executes the adjustment of the reference value according to a result of identification executed by the identifying means for a reference value adjustment chart,
        wherein an adjustment value Em of the reference value E for the identifying means is defined by using an image-section level Ew and an non-image level Eb and according to Em=(Ew+Eb)/X, the image-section level Ew and the non-image level Eb being obtained by sensing of an image section and by sensing of a non-imaging section, respectively, of the reference value adjustment chart outputted by the identifying means, and wherein the aforementioned X is an experience value α.

2. An image forming method for feeding image formation media toward an image forming apparatus and forming images on the image formation media, comprising:
    a step of feeding a first adjustment sheet to an identifying means provided for identifying an image section and a non-image section formed on the image formation media, the first adjustment sheet having a predetermined image and being used for adjustment of a reference value with which the identifying means performs identification;

a reading step of allowing the identifying means to read the image section of the first adjustment sheet and the non-image section of thereof;

a reference value adjusting step of adjusting the reference value of the identifying means according to a read value regarding the image section and a read value regarding the non-image section;

a step of feeding a second adjustment sheet to the identifying means of which the reference value has been adjusted in the reference value adjusting step, the second adjustment having a predetermined image and being used for adjustment of a speed at which the image formation media are fed to image forming means;

a speed adjustment step of adjusting a feeding speed for the image formation media according to results of the identification performed by the identifying means for the image section of the second adjustment sheet and the non-image section thereof; and a step of feeding the image formation media to the image forming means at the speed adjusted in the speed adjustment step and forming images on the image formation media that have been fed, wherein an adjustment value Em of the reference value E for the identifying means is defined by using an image-section level Ew and an non-image level Eb and according to Em=(Ew+Eb)/X, the image-section level Ew and the non-image level Eb being obtained by sensing of an image section and by sensing of a non-imaging section, respectively, of the first adjustment sheet outputted by the identifying means, and wherein the aforementioned X is an experience value α.

3. An image forming apparatus comprising:

image forming means for forming images by using developer;

supplying means for feeding image formation media toward the image forming means;

transporting means for transporting the image formation media that have been fed;

transferring means for transferring developer images formed on the image forming means onto the image formation media;

identifying means for performing identification of the type of the image formation media;

transportation speed adjusting means for performing adjustment of the speed of transportation by the supplying means for the image formation media, the adjustment being performed according to outputs from the identifying means; and identification reference adjusting means for adjusting a reference value E used for identification of the image formation media, the identification being performed by the identifying means, wherein a sequence for adjustment of the reference value E is executed by the identification reference adjusting means, and identification is thereby implemented for the type of adjustment sequences that are executed by the transportation speed adjusting means for the speed of transportation of the image formation media and the type of the image formation media, wherein the identification reference adjusting means executes the adjustment of the reference value according to a result of identification executed by the identifying means for a reference value adjustment chart, wherein an image-section level Ew is an output identical to one of a first image-section level Eaw, which is obtained through detection of an image section of the reference value adjustment chart output from the identifying means, and a second image-section level Eow, which is a detection output relevant to a white image of a transparent sheet, whichever is lower, and wherein an image-section level Eb is an output identical to one of a third image-section level Eab, which is obtained through detection of an image section of the reference value adjustment chart output from the identifying means, and a fourth image-section level Eob, which is a detection output relevant to a white image of a transparent sheet, whichever is higher.

4. An image forming method for feeding image formation media toward an image forming apparatus and forming images on the image formation media, comprising:

a step of feeding a first adjustment sheet to an identifying means provided for identifying an image section and a non-image section formed on the image formation media, the first adjustment sheet having a predetermined image and being used for adjustment of a reference value with which the identifying means performs identification;

a reading step of allowing the identifying means to read the image section of the first adjustment sheet and the non-image section of thereof;

a reference value adjusting step of adjusting the reference value of the identifying means according to a read value regarding the image section and a read value regarding the non-image section;

a step of feeding a second adjustment sheet to the identifying means of which the reference value has been adjusted in the reference value adjusting step, the second adjustment having a predetermined image and being used for adjustment of a speed at which the image formation media are fed to image forming means;

a speed adjustment step of adjusting a feeding speed for the image formation media according to results of the identification performed by the identifying means for the image section of the second adjustment sheet and the non-image section thereof; and a step of feeding the image formation media to the image forming means at the speed adjusted in the speed adjustment step and forming images on the image formation media that have been fed, wherein an adjustment value Ew of the reference value E for the identifying means is defined by using an image-section level being an output identical to one of a first image-section level Eaw, which is obtained through detection of an image section of the reference value adjustment chart output from the identifying means, and a second image-section level Eow, which is a detection output relevant to a white image of a transparent sheet, whichever is lower, and wherein an image-section level Eb is an output identical to one of a third image-section level Eab, which is obtained through detection of an image section of the reference value adjustment chart output from the identifying means, and a fourth image-section level Eob, which is a detection output relevant to a white image of a transparent sheet, whichever is higher.

* * * * *